US012613850B2

(12) United States Patent　　　　(10) Patent No.:　US 12,613,850 B2

Seul et al.　　　　　　　　　　　　(45) Date of Patent:　　Apr. 28, 2026

(54) UNIVERSAL CONTAINER FOR STRUCTURED AND UNSTRUCTURED DATA FROM DISPARATE SOURCES

(71) Applicant: BioInventors & Entrepreneurs Network, LLC, Warren, NJ (US)

(72) Inventors: Michael Seul, Basking Ridge, NJ (US); Reinhard Klemm, West New York, NJ (US)

(73) Assignee: BioInventors & Entrepreneurs Network, LLC, Warren, NJ (US)

( * ) Notice: Subject to any disclaimer, the term of this patent is extended or adjusted under 35 U.S.C. 154(b) by 114 days.

(21) Appl. No.: 18/108,440

(22) Filed: Feb. 10, 2023

(65) Prior Publication Data

US 2024/0273076 A1　　Aug. 15, 2024

(51) Int. Cl.
G06F 16/22　　　　(2019.01)
G06F 16/28　　　　(2019.01)

(52) U.S. Cl.
CPC ...... G06F 16/2282 (2019.01); G06F 16/2228 (2019.01); G06F 16/282 (2019.01)

(58) Field of Classification Search
CPC . G06F 16/2282; G06F 16/2228; G06F 16/282
See application file for complete search history.

(56) References Cited

U.S. PATENT DOCUMENTS

| | | | |
|---|---|---|---|
| 6,965,903 B1 | 11/2005 | Agarwal | |
| 7,747,610 B2 | 6/2010 | Chinchwadkar et al. | |

| | | | |
|---|---|---|---|
| 9,135,647 B2 * | 9/2015 | Witten | G06F 16/20 |
| 9,881,050 B2 * | 1/2018 | Chervirala | G06F 16/24 |
| 9,881,055 B1 * | 1/2018 | Kapoor | G06F 16/2452 |
| 11,693,852 B1 * | 7/2023 | Singh | G06F 16/2448 |
| | | | 707/737 |
| 2008/0059439 A1 | 3/2008 | Fan et al. | |
| 2008/0189277 A1 | 8/2008 | Meijer | |
| 2008/0221923 A1 * | 9/2008 | Shogan | G16H 50/20 |
| | | | 705/2 |
| 2011/0289118 A1 * | 11/2011 | Chen | G06F 16/86 |
| | | | 707/E17.054 |
| 2017/0011035 A1 | 1/2017 | Melnik et al. | |
| 2020/0176098 A1 * | 6/2020 | Lucas | G16H 10/60 |
| 2020/0320138 A1 | 10/2020 | Horn | |
| 2022/0036260 A1 * | 2/2022 | Krishnan | G06N 3/044 |

(Continued)

FOREIGN PATENT DOCUMENTS

| | | |
|---|---|---|
| WO | WO0185196 | 11/2001 |
| WO | WO2015010137 | 1/2015 |

OTHER PUBLICATIONS

Package 'patentr' Oct. 14, 202.

(Continued)

*Primary Examiner* — Kavita Stanley

(74) *Attorney, Agent, or Firm* — Eric P. Mirabel

(57)　　　　　ABSTRACT

The present invention discloses a universal data container, in the form of a generic tabular representation, and methods of navigating and transforming said generic tabular representation by invoking standard SQL-Expressions, implementing the equivalent of XPath expressions, obviating the need for SQL extensions or format-specific query languages, the container accommodating disparate sources regardless of type or format, placing structured and unstructured sources on an equal footing.

23 Claims, 13 Drawing Sheets

(56)                    References Cited

U.S. PATENT DOCUMENTS

| | | | | |
|---|---|---|---|---|
| 2022/0083565 | A1* | 3/2022 | Sethi | ..................... G06F 16/258 |
| 2022/0121807 | A1 | 4/2022 | Seul et al. | |
| 2022/0254462 | A1* | 8/2022 | Austring | ............... G16H 10/60 |
| 2023/0351308 | A1* | 11/2023 | Krishnan | ............... G06N 3/044 |
| 2024/0037082 | A1* | 2/2024 | Levy | ................... G06F 16/2386 |
| 2024/0220486 | A1 | 7/2024 | Sutrave | |
| 2024/0273094 | A1* | 8/2024 | Seul | ................... G06F 16/2443 |

OTHER PUBLICATIONS

Package 'xml2' Nov. 29, 2021.
Package 'xmlconvert' Oct. 14, 2022.
Sakr2009 ('Cardinality-aware purely relational XQuery processor', Journal of Database Management, vol. 20, Issue 3 (Jul.-Aug. 2009).
USPTO Office Action in U.S. Appl. No. 18/108,413, filed Jan. 14, 2025.
Package patentr Oct. 14, 2022.
TS Strom, "A Numerical Analysis Model for the Interpretation of In Vivo Platelet Consumption Data" PLOS One, Jan. 2013, vol. 8, Issue 1, pp. 1-9.
Enlund, J. (2014). Learn datalog Today. Learn Oatalog Today! https:/lwww.learndatalogtoday.org/, accessed May 3, 2025 (Year: 2014).
Enlund, J. (2014). Learn datalog Today. Learn Oatalog Today! https:/lwww.learndatalogtoday.org/chapter/8, accessed May 3, 2025 (Year: 2014).
Enlund, J. (2014). Learn datalog Today. Learn Oatalog Today! https:/lwww.learndatalogtoday.org/chapter/1, accessed May 3, 2025) (Year: 2014).
Enlund, J. (2014). Learn datalog Today. Learn Oatalog Today! https:/lwww.learndatalogtoday.org/chapter/2, accessed May 3, 2025 (Year: 2014).
RD Manu, From Trees to Tables: Storing Hierarchical Data in Relational Databases (Jan. 7, 2024) (online article).
PostgreSQL Materialized Path / Ltree to hierarchical JSON-object (2014) (online article).

* cited by examiner

Fig. 5

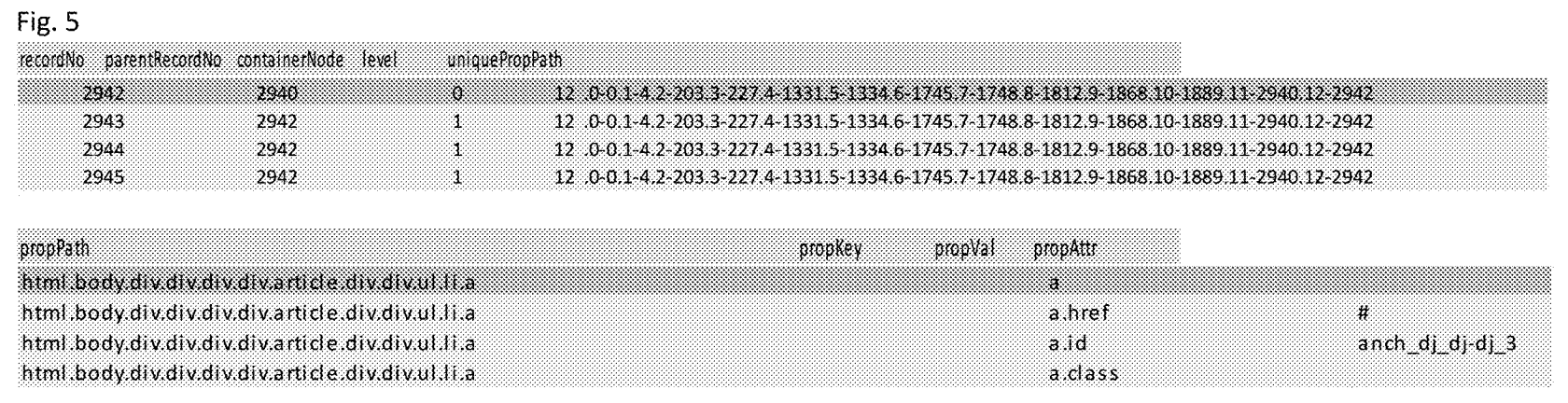

| recordNo | parentRecordNo | containerNode | level | uniquePropPath |
|---|---|---|---|---|
| 2942 | 2940 | | 0 | 12_0-0:1-4.2-203.3-227.4-1331.5-1334.6-1745.7-1748.8-1812.9-1868.10-1889.10-1889.11-2940.12-2942 |
| 2943 | 2942 | | 1 | 12_0-0:1-4.2-203.3-227.4-1331.5-1334.6-1745.7-1748.8-1812.9-1868.10-1889.11-2940.12-2942 |
| 2944 | 2942 | | 1 | 12_0-0:1-4.2-203.3-227.4-1331.5-1334.6-1745.7-1748.8-1812.9-1868.10-1889.11-2940.12-2942 |
| 2945 | 2942 | | 1 | 12_0-0:1-4.2-203.3-227.4-1331.5-1334.6-1745.7-1748.8-1812.9-1868.10-1889.11-2940.12-2942 |

| propPath | propKey | propVal | propAttr |
|---|---|---|---|
| html.body.div.div.div.div.article.div.div.ul.li.a | a | | |
| html.body.div.div.div.div.article.div.div.ul.li.a | | | a.href | # |
| html.body.div.div.div.div.article.div.div.ul.li.a | | | a.id | anch_dj_dj-dj_3 |
| html.body.div.div.div.div.article.div.div.ul.li.a | | | a.class |

Fig. 6

| recordNo | parentRecordNo | container | level | uniquePropPath | propPath | propKey | propVal |
|---|---|---|---|---|---|---|---|
| 0 | -1 | 1 | 0 | 0.0-0 | | | |
| 1 | 0 | 0 | 1 | 1.0-0.1-1 | status | status | final |
| 2 | 0 | 0 | 1 | 1.0-0.1-2 | valueQuantity | valueQuantity | |
| 3 | 2 | 2 | 0 | 2.0-0.1-2.2-3 | valueQuantity.code | code | mg/dL |
| 4 | 2 | 2 | 0 | 2.0-0.1-2.2-4 | valueQuantity.system | system | http://unitsofmeasure.org |
| 5 | 2 | 2 | 0 | 2.0-0.1-2.2-5 | valueQuantity.value | value | 68 |
| 6 | 2 | 2 | 0 | 2.0-0.1-2.2-6 | valueQuantity.unit | unit | mg/dL |
| 7 | 0 | 0 | 1 | 1.0-0.1-7 | category | category | |
| 8 | 7 | 7 | 0 | 2.0-0.1-7.2-8 | category.text | text | Laboratory |
| 9 | 7 | 7 | 1 | 2.0-0.1-7.2-9 | category.coding | coding | |
| 10 | 9 | 9 | 1 | 3.0-0.1-7.2-9.3-10 | category.coding[0] | coding[0] | 0 |
| 11 | 10 | 10 | 0 | 4.0-0.1-7.2-9.3-10.4-11 | category.coding[0].system | system | http://hl7.org/fhir/observation-category |
| 12 | 10 | 10 | 0 | 4.0-0.1-7.2-9.3-10.4-12 | category.coding[0].display | display | Laboratory |
| 13 | 10 | 10 | 0 | 4.0-0.1-7.2-9.3-10.4-13 | category.coding[0].code | code | laboratory |
| 14 | 0 | 0 | 0 | 1.0-0.1-14 | id | id | ResultObservation-131681021 |
| 15 | 0 | 0 | 1 | 1.0-0.1-15 | code | code | |
| 16 | 15 | 15 | 0 | 2.0-0.1-15.2-16 | code.text | text | HDLC |
| 17 | 0 | 0 | 1 | 1.0-0.1-17 | referenceRange | referenceRange | |
| 18 | 17 | 17 | 1 | 2.0-0.1-17.2-18 | referenceRange[0] | referenceRange[0] | 0 |
| 19 | 18 | 18 | 1 | 3.0-0.1-17.2-18.3-19 | referenceRange[0].low | low | |
| 20 | 19 | 19 | 0 | 4.0-0.1-17.2-18.3-19.4-20 | referenceRange[0].low.value | value | 40 |
| 21 | 19 | 19 | 0 | 4.0-0.1-17.2-18.3-19.4-21 | referenceRange[0].low.unit | unit | mg/dL |
| 22 | 18 | 18 | 1 | 3.0-0.1-17.2-18.3-22 | referenceRange[0].high | high | |
| 23 | 22 | 22 | 0 | 4.0-0.1-17.2-18.3-22.4-23 | referenceRange[0].high.value | value | 59 |
| 24 | 22 | 22 | 0 | 4.0-0.1-17.2-18.3-22.4-24 | referenceRange[0].high.unit | unit | mg/dL |
| 25 | 18 | 18 | 1 | 3.0-0.1-17.2-18.3-25 | referenceRange[0].meaning | meaning | |
| 26 | 25 | 25 | 0 | 4.0-0.1-17.2-18.3-25.4-26 | referenceRange[0].meaning.text | text | 40-59 |
| 27 | 0 | 0 | 1 | 1.0-0.1-27 | subject | subject | |
| 28 | 27 | 27 | 0 | 2.0-0.1-27.2-28 | subject.reference | reference | Patient/6231773 |
| 29 | 0 | 0 | 0 | 1.0-0.1-29 | effectiveDateTime | effectiveDateTime | 7/16/2021 13:20 |
| 30 | 0 | 0 | 0 | 1.0-0.1-30 | resourceType | resourceType | Observation |

Fig. 7

| recordNo | parentRecordNo | containerNode | level | uniquePropPath | propPath | propKey | propVal |
|---|---|---|---|---|---|---|---|
| 0 | -1 | -1 | 1 | 0:-0-0 | | | |
| 1 | 0 | 0 | 1 | 1:-0-0-1-1 | @context | @context | |
| 2 | 1 | 1 | 0 | 2:-0-0-1-1.2-2 | @context.0 | 0 | http://stardog.com/tutorial/ |
| 3 | 1 | 1 | 0 | 2:-0-0-1-1.2-3 | @context.rdf | rdf | http://www.w3.org/1999/02/22-rdf-syntax-ns# |
| 4 | 1 | 1 | 0 | 2:-0-0-1-1.2-4 | @context.xsd | xsd | http://www.w3.org/2001/XMLSchema# |
| 5 | 0 | 0 | 1 | 1:-0-0-1-5 | @graph | @graph | |
| 6 | 5 | 5 | 0 | 2:-0-0-1-5-2-6 | @graph[0] | @graph[0] | 0 |
| 7 | 6 | 6 | 0 | 3:-0-0-1-5-2-6-3-7 | @graph[0].@id | @id | 0:The_Beatles |
| 8 | 6 | 6 | 0 | 3:-0-0-1-5-2-6-3-8 | @graph[0].@type | @type | 0:Band |
| 9 | 6 | 6 | 0 | 3:-0-0-1-5-2-6-3-9 | @graph[0].0:name | 0:name | The Beatles |
| 10 | 6 | 6 | 1 | 3:-0-0-1-5-2-6-3-10 | @graph[0].0:member | 0:member | |
| 11 | 10 | 10 | 1 | 4:-0-0-1-5-2-6-3-10.4-11 | @graph[0].0:member[0] | @graph[0].0:member[0] | 0 |
| 12 | 11 | 10 | 0 | 5:-0-0-1-5-2-6-3-10.4-11.5-12 | @graph[0].0:member[0].@id | @id | 0:John_Lennon |
| 13 | 10 | 10 | 1 | 4:-0-0-1-5-2-6-3-10.4-13 | @graph[0].0:member[1] | @graph[0].0:member[1] | 1 |
| 14 | 13 | 10 | 0 | 5:-0-0-1-5-2-6-3-10.4-13.5-14 | @graph[0].0:member[1].@id | @id | 0:Paul_McCartney |
| 15 | 10 | 10 | 1 | 4:-0-0-1-5-2-6-3-10.4-15 | @graph[0].0:member[2] | @graph[0].0:member[2] | 2 |
| 16 | 15 | 10 | 0 | 5:-0-0-1-5-2-6-3-10.4-15.5-16 | @graph[0].0:member[2].@id | @id | 0:George_Harrison |
| 17 | 10 | 10 | 1 | 4:-0-0-1-5-2-6-3-10.4-17 | @graph[0].0:member[3] | @graph[0].0:member[3] | 3 |
| 18 | 17 | 10 | 0 | 5:-0-0-1-5-2-6-3-10.4-17.5-18 | @graph[0].0:member[3].@id | @id | 0:Ringo_Starr |
| 19 | 5 | 5 | 1 | 2:-0-0-1-5-2-19 | @graph[1] | @graph[1] | 1 |
| 20 | 19 | 19 | 0 | 3:-0-0-1-5-2-19.3-20 | @graph[1].@id | @id | 0:John_Lennon |
| 21 | 19 | 19 | 0 | 3:-0-0-1-5-2-19.3-21 | @graph[1].@type | @type | 0:SoloArtist |
| 22 | 5 | 5 | 1 | 2:-0-0-1-5-2-22 | @graph[2] | @graph[2] | 2 |
| 23 | 22 | 22 | 0 | 3:-0-0-1-5-2-22.3-23 | @graph[2].@id | @id | 0:Paul_McCartney |
| 24 | 22 | 22 | 0 | 3:-0-0-1-5-2-22.3-24 | @graph[2].@type | @type | 0:SoloArtist |
| 25 | 5 | 5 | 1 | 2:-0-0-1-5-2-25 | @graph[3] | @graph[3] | 3 |
| 26 | 25 | 25 | 0 | 3:-0-0-1-5-2-25.3-26 | @graph[3].@id | @id | 0:Ringo_Starr |
| 27 | 25 | 25 | 0 | 3:-0-0-1-5-2-25.3-27 | @graph[3].@type | @type | 0:SoloArtist |
| 28 | 5 | 5 | 1 | 2:-0-0-1-5-2-28 | @graph[4] | @graph[4] | 4 |
| 29 | 28 | 28 | 0 | 3:-0-0-1-5-2-28.3-29 | @graph[4].@id | @id | 0:George_Harrison |
| 30 | 28 | 28 | 0 | 3:-0-0-1-5-2-28.3-30 | @graph[4].@type | @type | 0:SoloArtist |
| 31 | 5 | 5 | 1 | 2:-0-0-1-5-2-31 | @graph[5] | @graph[5] | 5 |
| 32 | 31 | 31 | 0 | 3:-0-0-1-5-2-31.3-32 | @graph[5].@id | @id | 0:Please_Please_Me |
| 33 | 31 | 31 | 0 | 3:-0-0-1-5-2-31.3-33 | @graph[5].@type | @type | 0:Album |
| 34 | 31 | 31 | 0 | 3:-0-0-1-5-2-31.3-34 | @graph[5].0:name | 0:name | Please Please Me |
| 35 | 31 | 31 | 1 | 3:-0-0-1-5-2-31.3-35 | @graph[5].0:date | 0:date | |
| 36 | 35 | 35 | 0 | 4:-0-0-1-5-2-31.3-35.4-36 | @graph[5].0:date.@value | @value | 3/22/1963 |
| 37 | 35 | 35 | 0 | 4:-0-0-1-5-2-31.3-35.4-37 | @graph[5].0:date.@type | @type | xsd:date |
| 38 | 31 | 31 | 1 | 3:-0-0-1-5-2-31.3-38 | @graph[5].0:artist | 0:artist | |
| 39 | 38 | 38 | 0 | 4:-0-0-1-5-2-31.3-38.4-39 | @graph[5].0:artist.@id | @id | 0:The_Beatles |
| 40 | 31 | 31 | 1 | 3:-0-0-1-5-2-31.3-40 | @graph[5].0:track | 0:track | |
| 41 | 40 | 40 | 0 | 4:-0-0-1-5-2-31.3-40.4-41 | @graph[5].0:track.@id | @id | 0:Love_Me_Do |
| 42 | 5 | 5 | 1 | 2:-0-0-1-5-2-42 | @graph[6] | @graph[6] | 6 |
| 43 | 42 | 42 | 0 | 3:-0-0-1-5-2-42.3-43 | @graph[6].@id | @id | 0:Love_Me_Do |
| 44 | 42 | 42 | 0 | 3:-0-0-1-5-2-42.3-44 | @graph[6].@type | @type | 0:Song |
| 45 | 42 | 42 | 0 | 3:-0-0-1-5-2-42.3-45 | @graph[6].0:name | 0:name | Love Me Do |
| 46 | 42 | 42 | 0 | 3:-0-0-1-5-2-42.3-46 | @graph[6].0:length | 0:length | 125 |
| 47 | 42 | 42 | 1 | 3:-0-0-1-5-2-42.3-47 | @graph[6].0:writer | 0:writer | |
| 48 | 47 | 47 | 1 | 4:-0-0-1-5-2-42.3-47.4-48 | @graph[6].0:writer[0] | @graph[6].0:writer[0] | 0 |
| 49 | 48 | 47 | 0 | 5:-0-0-1-5-2-42.3-47.4-48.5-49 | @graph[6].0:writer[0].@id | @id | 0:John_Lennon |
| 50 | 47 | 47 | 1 | 4:-0-0-1-5-2-42.3-47.4-50 | @graph[6].0:writer[1] | @graph[6].0:writer[1] | 1 |
| 51 | 50 | 50 | 0 | 5:-0-0-1-5-2-42.3-47.4-50.5-51 | @graph[6].0:writer[1].@id | @id | 0:Paul_McCartney |

Fig. 8

| recordNo | parentsRecordNo | leaf | level | uniquePropPath | propPath | propKey | propVal | propAttr |
|---|---|---|---|---|---|---|---|---|
| 0 | -1 | 0 | 0 | 0:-0-0 | | | | |
| 1 | 0 | 1 | 0 | 0:-0-0 | | xmlns | | http://www.w3.org/2000/svg |
| 2 | 0 | 1 | 0 | 0:-0-0 | | xmlns:xlink | | http://www.w3.org/1999/xlink |
| 3 | 0 | 1 | 0 | 0:-0-0 | | class | | svglite |
| 4 | 0 | 1 | 0 | 0:-0-0 | | width | | 792.00pt |
| 5 | 0 | 1 | 0 | 0:-0-0 | | height | | 504.00pt |
| 6 | 0 | 1 | 0 | 0:-0-0 | | viewBox | | 0 0 792.00 504.00 |
| 7 | 0 | 0 | 1 | 1:-0-0-1-7 | defs | defs | | |
| 8 | 7 | 0 | 2 | 2:-0-0-1-7.2-8 | defs.style | style | | |
| 9 | 8 | 1 | 2 | 2:-0-0-1-7.2-8 | defs.style | style.type | | text/css |
| 10 | 8 | 1 | 3 | 3:-0-0-1-7.2-8.3-10 | defs.style.#cdata-section | #cdata-section | | |
| 11 | 0 | 0 | 1 | 1:-0-0-1-11 | rect | rect | | |
| 12 | 11 | 1 | 1 | 1:-0-0-1-11 | rect | rect.width | | 100% |
| 13 | 11 | 1 | 1 | 1:-0-0-1-11 | rect | rect.height | | 100% |
| 14 | 11 | 1 | 1 | 1:-0-0-1-11 | rect | rect.style | | stroke:none; fill:#FFFFF0; |
| 15 | 0 | 0 | 1 | 1:-0-0-1-15 | defs | defs | | |
| 16 | 15 | 0 | 2 | 2:-0-0-1-15.2-16 | defs.clipPath | clipPath | | |
| 17 | 16 | 1 | 2 | 2:-0-0-1-15.2-16 | defs.clipPath | clipPath.id | | cpMC4wMHw3OTIuMDB8MC4wMHw1MDQuMDA= |
| 18 | 16 | 1 | 3 | 3:-0-0-1-15.2-16.3-18 | defs.clipPath.rect | rect | | 0 |
| 19 | 18 | 1 | 3 | 3:-0-0-1-15.2-16.3-18 | defs.clipPath.rect | rect.x | | 0 |
| 20 | 18 | 1 | 3 | 3:-0-0-1-15.2-16.3-18 | defs.clipPath.rect | rect.y | | 0 |
| 21 | 18 | 1 | 3 | 3:-0-0-1-15.2-16.3-18 | defs.clipPath.rect | rect.width | | 792 |
| 22 | 18 | 1 | 3 | 3:-0-0-1-15.2-16.3-18 | defs.clipPath.rect | rect.height | | 504 |
| 23 | 0 | 0 | 1 | 1:-0-0-1-23 | g | g | | |
| 24 | 23 | 1 | 1 | 1:-0-0-1-23 | g | g.clip-path | | url(#cpMC4wMHw3OTIuMDB8MC4wMHw1MDQuMDA=) |
| 25 | 23 | 1 | 2 | 2:-0-0-1-23.2-25 | g.rect | rect | | |
| 26 | 25 | 1 | 2 | 2:-0-0-1-23.2-25 | g.rect | rect.x | | 85.07 |
| 27 | 25 | 1 | 2 | 2:-0-0-1-23.2-25 | g.rect | rect.y | | 183.51 |
| 28 | 25 | 1 | 2 | 2:-0-0-1-23.2-25 | g.rect | rect.width | | 17.59 |
| 29 | 25 | 1 | 2 | 2:-0-0-1-23.2-25 | g.rect | rect.height | | 214.57 |
| 30 | 25 | 1 | 2 | 2:-0-0-1-23.2-25 | g.rect | rect.style | | stroke-width: 0.75; fill: #808080; fill-opacity: 0.50; |
| 31 | 23 | 1 | 2 | 2:-0-0-1-23.2-31 | g.rect | rect | | |
| 32 | 31 | 1 | 2 | 2:-0-0-1-23.2-31 | g.rect | rect.x | | 106.17 |
| 33 | 31 | 1 | 2 | 2:-0-0-1-23.2-31 | g.rect | rect.y | | 168.18 |
| 34 | 31 | 1 | 2 | 2:-0-0-1-23.2-31 | g.rect | rect.width | | 17.59 |
| 35 | 31 | 1 | 2 | 2:-0-0-1-23.2-31 | g.rect | rect.height | | 229.9 |
| 36 | 31 | 1 | 2 | 2:-0-0-1-23.2-31 | g.rect | rect.style | | stroke-width: 0.75; fill: #808080; fill-opacity: 0.50; |
| 37 | 23 | 1 | 2 | 2:-0-0-1-23.2-37 | g.rect | rect | | |
| 38 | 37 | 1 | 2 | 2:-0-0-1-23.2-37 | g.rect | rect.x | | 127.27 |
| 39 | 37 | 1 | 2 | 2:-0-0-1-23.2-37 | g.rect | rect.y | | 168.18 |
| 40 | 37 | 1 | 2 | 2:-0-0-1-23.2-37 | g.rect | rect.width | | 17.59 |
| 41 | 37 | 1 | 2 | 2:-0-0-1-23.2-37 | g.rect | rect.height | | 229.9 |

...

Fig. 8 (con't)

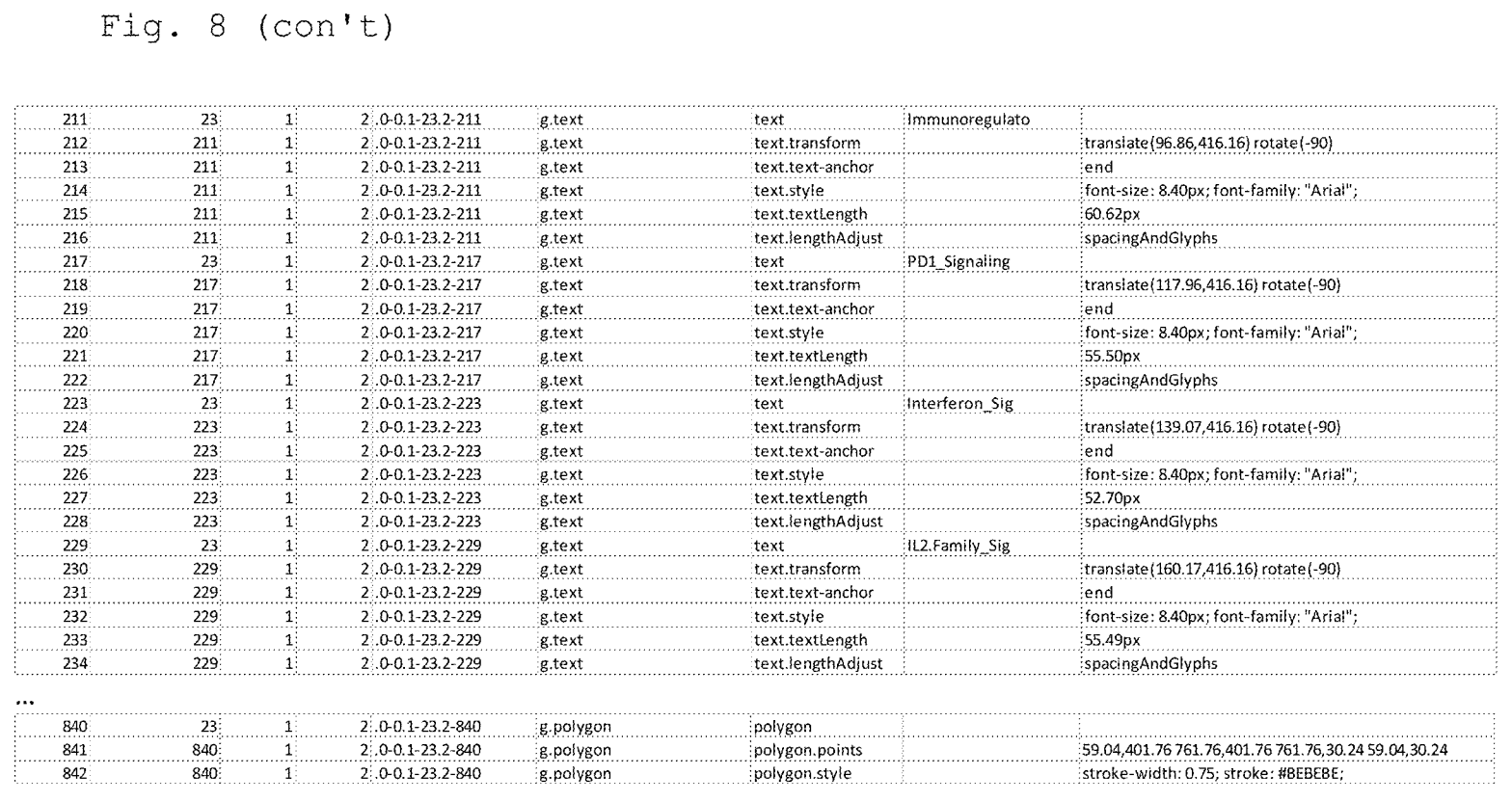

| | | | | | | | |
|---|---|---|---|---|---|---|---|
| 211 | 23 | 1 | 2:0-0.1-23.2-211 | g.text | text | Immunoregulato | |
| 212 | 211 | 1 | 2:0-0.1-23.2-211 | g.text | text.transform | | translate(96.86,416.16) rotate(-90) |
| 213 | 211 | 1 | 2:0-0.1-23.2-211 | g.text | text.text-anchor | | end |
| 214 | 211 | 1 | 2:0-0.1-23.2-211 | g.text | text.style | | font-size: 8.40px; font-family: "Arial"; |
| 215 | 211 | 1 | 2:0-0.1-23.2-211 | g.text | text.textLength | | 60.62px |
| 216 | 211 | 1 | 2:0-0.1-23.2-211 | g.text | text.lengthAdjust | | spacingAndGlyphs |
| 217 | 23 | 1 | 2:0-0.1-23.2-217 | g.text | text | PD1_Signaling | |
| 218 | 217 | 1 | 2:0-0.1-23.2-217 | g.text | text.transform | | translate(117.96,416.16) rotate(-90) |
| 219 | 217 | 1 | 2:0-0.1-23.2-217 | g.text | text.text-anchor | | end |
| 220 | 217 | 1 | 2:0-0.1-23.2-217 | g.text | text.style | | font-size: 8.40px; font-family: "Arial"; |
| 221 | 217 | 1 | 2:0-0.1-23.2-217 | g.text | text.textLength | | 55.50px |
| 222 | 217 | 1 | 2:0-0.1-23.2-217 | g.text | text.lengthAdjust | | spacingAndGlyphs |
| 223 | 23 | 1 | 2:0-0.1-23.2-223 | g.text | text | Interferon_Sig | |
| 224 | 223 | 1 | 2:0-0.1-23.2-223 | g.text | text.transform | | translate(139.07,416.16) rotate(-90) |
| 225 | 223 | 1 | 2:0-0.1-23.2-223 | g.text | text.text-anchor | | end |
| 226 | 223 | 1 | 2:0-0.1-23.2-223 | g.text | text.style | | font-size: 8.40px; font-family: "Arial"; |
| 227 | 223 | 1 | 2:0-0.1-23.2-223 | g.text | text.textLength | | 52.70px |
| 228 | 223 | 1 | 2:0-0.1-23.2-223 | g.text | text.lengthAdjust | | spacingAndGlyphs |
| 229 | 23 | 1 | 2:0-0.1-23.2-229 | g.text | text | iL2.Family_Sig | |
| 230 | 229 | 1 | 2:0-0.1-23.2-229 | g.text | text.transform | | translate(160.17,416.16) rotate(-90) |
| 231 | 229 | 1 | 2:0-0.1-23.2-229 | g.text | text.text-anchor | | end |
| 232 | 229 | 1 | 2:0-0.1-23.2-229 | g.text | text.style | | font-size: 8.40px; font-family: "Arial"; |
| 233 | 229 | 1 | 2:0-0.1-23.2-229 | g.text | text.textLength | | 55.49px |
| 234 | 229 | 1 | 2:0-0.1-23.2-229 | g.text | text.lengthAdjust | | spacingAndGlyphs |
| 840 | 23 | 1 | 2:0-0.1-23.2-840 | g.polygon | polygon | | |
| 841 | 840 | 1 | 2:0-0.1-23.2-840 | g.polygon | polygon.points | | 59.04,401.76 761.76,401.76 761.76,30.24 59.04,30.24 |
| 842 | 840 | 1 | 2:0-0.1-23.2-840 | g.polygon | polygon.style | | stroke-width: 0.75; stroke: #8EBEBE; |

Fig. 9

| Condition | Approved Targeted Therapy |
|---|---|
| Targeted therapy approved for bladder cancer | atezolizumab (Tecentriq) |
| Targeted therapy approved for bladder cancer | avelumab (Bavencio) |
| Targeted therapy approved for bladder cancer | enfortumab vedotin-ejfv (Padcev |
| Targeted therapy approved for bladder cancer | erdafitinib (Balversa) |
| Targeted therapy approved for bladder cancer | nivolumab (Opdivo) |
| Targeted therapy approved for bladder cancer | pembrolizumab (Keytruda) |
| Targeted therapy approved for bladder cancer | sacituzumab govitecan-hziy (Trodelvy) |
| Targeted therapy approved for brain cancer | belzutifan (Welireg) |
| Targeted therapy approved for brain cancer | bevacizumab (Avastin) |
| Targeted therapy approved for brain cancer | everolimus (Afinitor) |
| Targeted therapy approved for breast cancer | abemaciclib (Verzenio) |
| Targeted therapy approved for breast cancer | ado-trastuzumab emtansine (Kadcyla) |
| Targeted therapy approved for breast cancer | alpelisib (Piqray) |
| Targeted therapy approved for breast cancer | anastrozole (Arimidex) |
| Targeted therapy approved for breast cancer | everolimus (Afinitor) |
| Targeted therapy approved for breast cancer | exemestane (Aromasin) |
| | ... |

| recordNo | parentRecordNo | containerNode | level | uniquePropPath | propPath | propKey | propVal |
|---|---|---|---|---|---|---|---|
| 204 | -1 | 1 | 0 | 0.0-204 | | | |
| 205 | 204 | 0 | 1 | 0.0-204.1-205 | Clinical_Condition | Clinical_Condition | Targeted therapy approved for cervical cancer |
| 206 | 204 | 0 | 1 | 0.0-204.1-206 | Approved_Targeted_Therapy | Approved_Targeted_Therapy | bevacizumab (Avastin) |
| 207 | 204 | 0 | 1 | 0.0-204.1-207 | drugName | drugName | bevacizumab |
| 208 | 204 | 0 | 1 | 0.0-204.1-208 | brandName | brandName | Avastin |
| 209 | 204 | 0 | 1 | 0.0-204.1-209 | id | id | 1.67138E+12 |
| 210 | -1 | 1 | 0 | 0.0-210 | | | |
| 211 | 210 | 0 | 1 | 0.0-210.1-211 | Clinical_Condition | Clinical_Condition | Targeted therapy approved for cervical cancer |
| 212 | 210 | 0 | 1 | 0.0-210.1-212 | Approved_Targeted_Therapy | Approved_Targeted_Therapy | pembrolizumab (Keytruda) |
| 213 | 210 | 0 | 1 | 0.0-210.1-213 | drugName | drugName | pembrolizumab |
| 214 | 210 | 0 | 1 | 0.0-210.1-214 | brandName | brandName | Keytruda |
| 215 | 210 | 0 | 1 | 0.0-210.1-215 | id | id | 1.67138E+12 |
| 216 | -1 | 1 | 0 | 0.0-216 | | | |
| 217 | 216 | 0 | 1 | 0.0-216.1-217 | Clinical_Condition | Clinical_Condition | Targeted therapy approved for cervical cancer |
| 218 | 216 | 0 | 1 | 0.0-216.1-218 | Approved_Targeted_Therapy | Approved_Targeted_Therapy | tisotumab vedotin-tftv (Tivdak) |
| 219 | 216 | 0 | 1 | 0.0-216.1-219 | drugName | drugName | tisotumab-vedotin-tftv |
| 220 | 216 | 0 | 1 | 0.0-216.1-220 | brandName | brandName | Tivdak |
| 221 | 216 | 0 | 1 | 0.0-216.1-221 | id | id | 1.67138E+12 |

| GenericName | TradeName |
|---|---|
| afatinib dimaleate | Gilotrif |
| alectinib | Alecensa |
| amivantamab-vmjw | Rybrevant |
| atezolizumab | Tecentriq |
| bevacizumab | Avastin |
| brigatinib | Alunbriq |
| capmatinib hydrochloride | Tabrecta |
| cemiplimab-rwlc | Libtayo |
| ceritinib | Zykadia |
| crizotinib | Xalkori |
| dabrafenib mesylate | Tafinlar |
| dacomitinib | Vizimpro |
| durvalumab?y | Imfinzi |
| entrectini | Rozlytrek |
| erlotinib hydrochloride | Tarceva |
| fam-trastuzumab deruxtecan-nxki | Enhertu |
| gefitinib | Iressa |
| ipilimumab | Yervoy |
| lorlatinib | Lorbrena |
| mobocertinib succinate | Exkivity |
| necitumumab | Portrazza |
| nivolumab | Opdivo |
| osimertinib mesylate | Tagrisso |
| pembrolizumab | Keytruda |
| pralsetinib | Gavreto |
| ramucirumab | Cyramza |
| selpercatinib | Retevm |
| sotorasib | Lumakras |
| tepotinib hydrochloride | Tepmetko |
| trametinib dimethyl sulfoxide | Mekinist |

Fig. 12

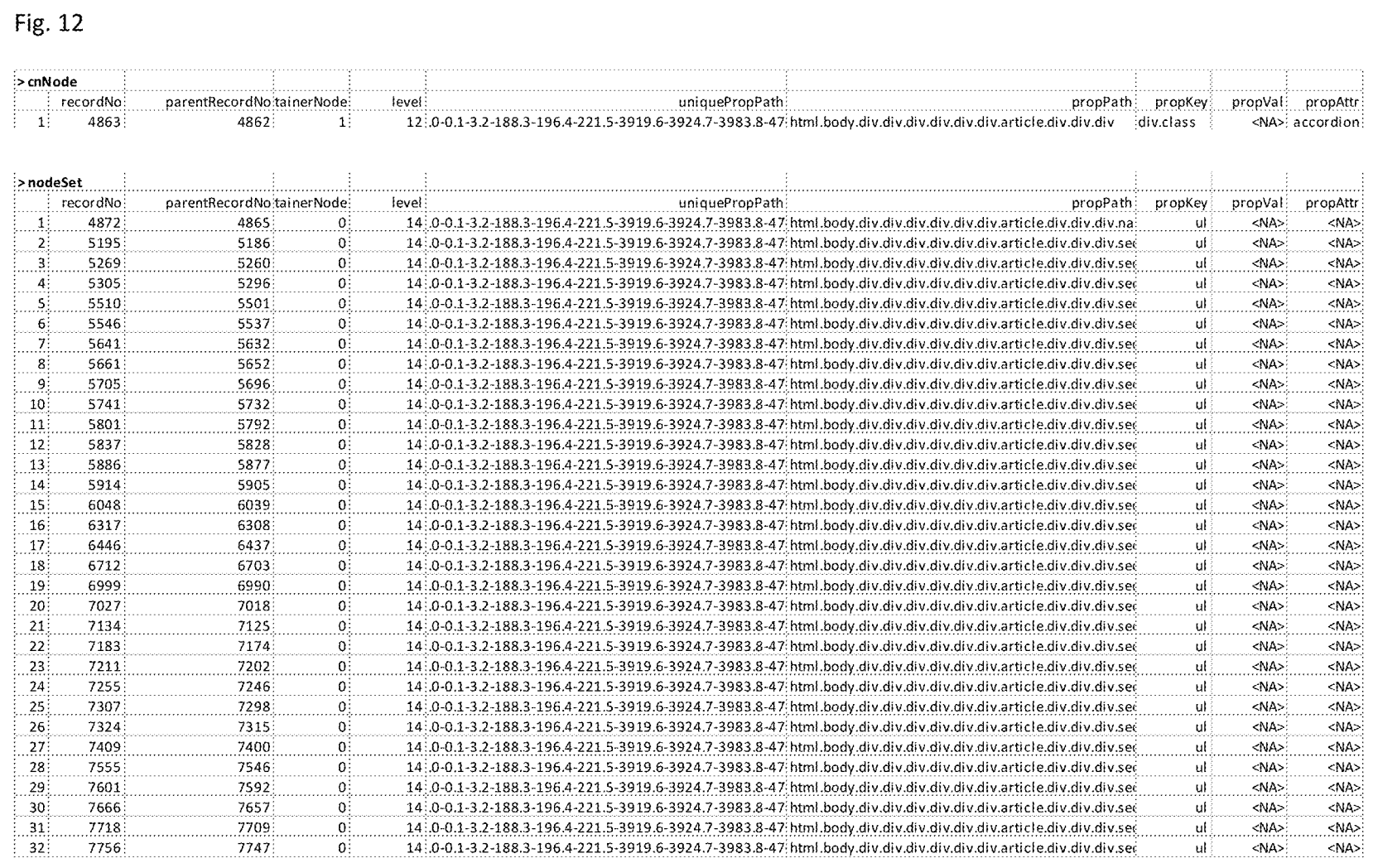

> cnNode

| recordNo | parentRecordNo | containerNode | level | uniquePropPath | propPath | propKey | propVal | propAttr |
|---|---|---|---|---|---|---|---|---|
| 4863 | 4862 | 1 | 12 | 0-0.1-3.2-188.3-196.4-221.5-3919.6-3924.7-3983.8-47 | html.body.div.div.div.div.article.div.div.div | div.class | <NA> | accordion |

> nodeSet

| recordNo | parentRecordNo | containerNode | level | uniquePropPath | propPath | propKey | propVal | propAttr |
|---|---|---|---|---|---|---|---|---|
| 4872 | 4865 | 0 | 14 | 0-0.1-3.2-188.3-196.4-221.5-3919.6-3924.7-3983.8-47 | html.body.div.div.div.div.article.div.div.na | ul | <NA> | <NA> |
| 5195 | 5186 | 0 | 14 | 0-0.1-3.2-188.3-196.4-221.5-3919.6-3924.7-3983.8-47 | html.body.div.div.div.div.article.div.div.se | ul | <NA> | <NA> |
| 5269 | 5260 | 0 | 14 | 0-0.1-3.2-188.3-196.4-221.5-3919.6-3924.7-3983.8-47 | html.body.div.div.div.div.article.div.div.se | ul | <NA> | <NA> |
| 5305 | 5296 | 0 | 14 | 0-0.1-3.2-188.3-196.4-221.5-3919.6-3924.7-3983.8-47 | html.body.div.div.div.div.article.div.div.se | ul | <NA> | <NA> |
| 5510 | 5501 | 0 | 14 | 0-0.1-3.2-188.3-196.4-221.5-3919.6-3924.7-3983.8-47 | html.body.div.div.div.div.article.div.div.se | ul | <NA> | <NA> |
| 5546 | 5537 | 0 | 14 | 0-0.1-3.2-188.3-196.4-221.5-3919.6-3924.7-3983.8-47 | html.body.div.div.div.div.article.div.div.se | ul | <NA> | <NA> |
| 5641 | 5632 | 0 | 14 | 0-0.1-3.2-188.3-196.4-221.5-3919.6-3924.7-3983.8-47 | html.body.div.div.div.div.article.div.div.se | ul | <NA> | <NA> |
| 5661 | 5652 | 0 | 14 | 0-0.1-3.2-188.3-196.4-221.5-3919.6-3924.7-3983.8-47 | html.body.div.div.div.div.article.div.div.se | ul | <NA> | <NA> |
| 5705 | 5696 | 0 | 14 | 0-0.1-3.2-188.3-196.4-221.5-3919.6-3924.7-3983.8-47 | html.body.div.div.div.div.article.div.div.se | ul | <NA> | <NA> |
| 5741 | 5732 | 0 | 14 | 0-0.1-3.2-188.3-196.4-221.5-3919.6-3924.7-3983.8-47 | html.body.div.div.div.div.article.div.div.se | ul | <NA> | <NA> |
| 5801 | 5792 | 0 | 14 | 0-0.1-3.2-188.3-196.4-221.5-3919.6-3924.7-3983.8-47 | html.body.div.div.div.div.div.article.div.div.div.se | ul | <NA> | <NA> |
| 5837 | 5828 | 0 | 14 | 0-0.1-3.2-188.3-196.4-221.5-3919.6-3924.7-3983.8-47 | html.body.div.div.div.div.article.div.div.se | ul | <NA> | <NA> |
| 5886 | 5877 | 0 | 14 | 0-0.1-3.2-188.3-196.4-221.5-3919.6-3924.7-3983.8-47 | html.body.div.div.div.div.article.div.div.se | ul | <NA> | <NA> |
| 5914 | 5905 | 0 | 14 | 0-0.1-3.2-188.3-196.4-221.5-3919.6-3924.7-3983.8-47 | html.body.div.div.div.div.article.div.div.se | ul | <NA> | <NA> |
| 6048 | 6039 | 0 | 14 | 0-0.1-3.2-188.3-196.4-221.5-3919.6-3924.7-3983.8-47 | html.body.div.div.div.div.div.div.article.div.div.div.se | ul | <NA> | <NA> |
| 6317 | 6308 | 0 | 14 | 0-0.1-3.2-188.3-196.4-221.5-3919.6-3924.7-3983.8-47 | html.body.div.div.div.div.article.div.div.se | ul | <NA> | <NA> |
| 6446 | 6437 | 0 | 14 | 0-0.1-3.2-188.3-196.4-221.5-3919.6-3924.7-3983.8-47 | html.body.div.div.div.div.article.div.div.se | ul | <NA> | <NA> |
| 6712 | 6703 | 0 | 14 | 0-0.1-3.2-188.3-196.4-221.5-3919.6-3924.7-3983.8-47 | html.body.div.div.div.div.article.div.div.se | ul | <NA> | <NA> |
| 6999 | 6990 | 0 | 14 | 0-0.1-3.2-188.3-196.4-221.5-3919.6-3924.7-3983.8-47 | html.body.div.div.div.div.article.div.div.se | ul | <NA> | <NA> |
| 7027 | 7018 | 0 | 14 | 0-0.1-3.2-188.3-196.4-221.5-3919.6-3924.7-3983.8-47 | html.body.div.div.div.div.article.div.div.se | ul | <NA> | <NA> |
| 7134 | 7125 | 0 | 14 | 0-0.1-3.2-188.3-196.4-221.5-3919.6-3924.7-3983.8-47 | html.body.div.div.div.div.article.div.div.se | ul | <NA> | <NA> |
| 7183 | 7174 | 0 | 14 | 0-0.1-3.2-188.3-196.4-221.5-3919.6-3924.7-3983.8-47 | html.body.div.div.div.div.article.div.div.se | ul | <NA> | <NA> |
| 7211 | 7202 | 0 | 14 | 0-0.1-3.2-188.3-196.4-221.5-3919.6-3924.7-3983.8-47 | html.body.div.div.div.div.div.div.article.div.div.div.se | ul | <NA> | <NA> |
| 7255 | 7246 | 0 | 14 | 0-0.1-3.2-188.3-196.4-221.5-3919.6-3924.7-3983.8-47 | html.body.div.div.div.div.article.div.div.se | ul | <NA> | <NA> |
| 7307 | 7298 | 0 | 14 | 0-0.1-3.2-188.3-196.4-221.5-3919.6-3924.7-3983.8-47 | html.body.div.div.div.div.article.div.div.se | ul | <NA> | <NA> |
| 7324 | 7315 | 0 | 14 | 0-0.1-3.2-188.3-196.4-221.5-3919.6-3924.7-3983.8-47 | html.body.div.div.div.div.article.div.div.se | ul | <NA> | <NA> |
| 7409 | 7400 | 0 | 14 | 0-0.1-3.2-188.3-196.4-221.5-3919.6-3924.7-3983.8-47 | html.body.div.div.div.div.article.div.div.se | ul | <NA> | <NA> |
| 7555 | 7546 | 0 | 14 | 0-0.1-3.2-188.3-196.4-221.5-3919.6-3924.7-3983.8-47 | html.body.div.div.div.div.article.div.div.se | ul | <NA> | <NA> |
| 7601 | 7592 | 0 | 14 | 0-0.1-3.2-188.3-196.4-221.5-3919.6-3924.7-3983.8-47 | html.body.div.div.div.div.article.div.div.se | ul | <NA> | <NA> |
| 7666 | 7657 | 0 | 14 | 0-0.1-3.2-188.3-196.4-221.5-3919.6-3924.7-3983.8-47 | html.body.div.div.div.div.div.div.article.div.div.div.se | ul | <NA> | <NA> |
| 7718 | 7709 | 0 | 14 | 0-0.1-3.2-188.3-196.4-221.5-3919.6-3924.7-3983.8-47 | html.body.div.div.div.div.article.div.div.se | ul | <NA> | <NA> |
| 7756 | 7747 | 0 | 14 | 0-0.1-3.2-188.3-196.4-221.5-3919.6-3924.7-3983.8-47 | html.body.div.div.div.div.article.div.div.se | ul | <NA> | <NA> |

UNIVERSAL CONTAINER FOR STRUCTURED AND UNSTRUCTURED DATA FROM DISPARATE SOURCES

BACKGROUND

A perennial problem in connection with data integration is that of sourcing and processing content from disparate sources. This problem is exacerbated for hierarchically organized source documents such as XML, HTML or JSON files, given the fundamental difference between hierarchical and relational data models; format-specific query languages such as XPath, XQuery or JSONQuery have been developed to query such source documents or data structures.

The problem has continued to attract attention, as illustrated by these contributions.

Thus, application US20080059439A1 considers the problem of translating queries directed to a structured document to SQL queries directed to content from the original document 'shredded' into a relational data model, appealing to specific mathematical properties of these mappings. This method does not provide a query-able universal container for data from disparate sources.

U.S. Pat. No. 7,747,610 discloses a "method of processing path-based queries requesting data from at least one markup language document", " . . . to generate a query tree corresponding to the path-based query". This disclosure extends approach implemented in XPath and does not address the problem of providing a universal data container holding data from disparate sources.

Application US20170011035A1 discloses " . . . programmatic access to persistent XML and relational data . . . based upon explicit mappings between object classes, XML Schema types, and relations". This approach requires knowledge of source document schemas and proceeds by constructing classes in accordance with such schemas and representing content in the form of objects within such classes. It does not contemplate the representation of content in a universal data container in the form of a generic tabular representation that is populated by recursive traversal.

Sakr2009 ('Cardinality-aware purely relational XQuery processor', Journal of Database Management, Vol. 20, Issue 3 (July-August) 2009), available at 'go.gale.com' describes a mapping of the information of an XML node hierarchy to a relational table that preserves the relationship between the nodes. This is constructed during pre-order traversal of the XML document, by assigning to each node its pre-order rank, as well as: the size, defined as the number of nodes in the subtree below the node, and the level, defined as the number of edges connecting that node to the root; logical expressions are given in terms of these and other quantities to characterize XPath axes. However, in contrast to the generic representation of the invention, the mapping in Sakr2009 makes no reference to absolute paths, nor does it provide an implementation of RelationshipPrimitives.

A reference related to 'jCodeDisclosure' discussed herein is: "Programmatic Creation of Dynamically Configured, Hierarchically Organized Hyperlinked XML Documents For Presenting Data and Domain Knowledge From Diverse Sources" US Publ'n No. US20220121807A1 (incorporated by reference).

Accordingly, what is needed is a data structure for integrating data and knowledge items from disparate sources of a multiplicity of type, mode and format, providing a common intermediate representation to facilitate the selection of 'mixed' content for presentation in target documents or data models.

SUMMARY

The present invention discloses a universal data container, in the form of a generic tabular representation, and methods of navigating and transforming said generic tabular representation by invoking standard SQL, regardless of source type or format, placing structured and unstructured sources on an equal footing and obviating the need for SQL extensions or format-specific query languages. In that regard, the present invention differs from the approach taken by developers and vendors of relational databases such as MSSQL, PostGreSQL and others who have extended their offerings to provide support for XML and JSON data types, with corresponding special (non-standard) SQL extensions.

The generic tabular representation is created by traversal, preferably by recursive Depth-First Search, of a hierarchical data structure derived from Sources, such as documents or data structures derived therefrom, or otherwise provided, where Sources may be of different mode (such as documents & scaled vector graphics), type and format, as defined herein.

Specifically, the generic tabular representation of the invention may be:

created, without referencing a schema description, by recursive traversal of a first data structure that is derived by common parsers from source documents or other data sources, or is otherwise provided, wherein the step of creating comprises the construction of PathCodes, defined herein;

navigated and transformed by RelationshipPrimitives and Chained Self-Joins, preferably implemented in standard SQL, as disclosed herein, to populate application-specific relational data models or target documents (see also 'jCode Disclosure');

back-transformed to recover the source document or data structure—in the case of a generic tabular representation of a CSV table, the requisite 'pivot query' is readily implemented in accordance with the Chained Self-Join pattern, as illustrated herein; and operated as an event store.

Queries Without Recursion—The PathCodes of the generic tabular representation of the invention permit the implementation of RelationshipPrimitives without invoking recursion, which otherwise would be required for implementing relations defined in terms of transitive closure, notably: Ancestor in terms of Parent, or Descendant in terms of Child. The ability to devise SQL queries without the need for recursion substantially reduces the complexity of navigating the generic representation of the invention.

A Common Intermediate Representation—Accordingly, the generic tabular representation provides a universal intermediate representation of disparate Sources analogous to that provided by the intermediate codes produced by modern compilers, the intermediate representation of the invention serving as the common source for populating, in a data flow, downstream data tables or documents, as illustrated in FIGS. 1, 2 and 3. Accordingly, it is a preferred medium for data integration as an alternative to data virtualization, that places data from structured and unstructured Sources on an equal footing.

BRIEF DESCRIPTION OF THE FIGURES

FIG. 5—A section of a generic tabular representation of an HTML page source, described in Example 1.1

FIG. 6—Generic tabular representation of a FHIR resource, in JSON format, described in Example 1.2; fields are described in 'Detailed Description'

FIG. 7—Generic tabular representation of an RDF source document, in compressed Turtle format, described in Example 1.3

FIG. 8—Generic tabular representation of the SVG file renderer in FIG. 4, as described in Example 1.4; the field name 'leaf' (aka 'isLeaf') in this table, corresponds to 'containerNode' (aka 'isContainerNode') in other examples.

FIG. 9—A data table produced by a transformation query in the form of a Chained Self-Join pattern, directed to a generic tabular representation, described in Example 2.2.1

FIG. 10—Generic tabular representation of a CSV source table holding a listing of approved targeted cancer therapies, described in Example 2.2.2

FIG. 11—A data table produced by an r-Expression directed to a generic tabular representation, described in Example 2.4.1

FIG. 12—Subset of the generic tabular representation extracted by an r-Expression that specifies a context node, by invoking an f-Expression, and selects a node set, by invoking the p-Expression (aka RelationshipPrimitive) 'descendant' in relation to that context node, as described in Example 2.5.1

DETAILED DESCRIPTION

Definitions

Figure 1:
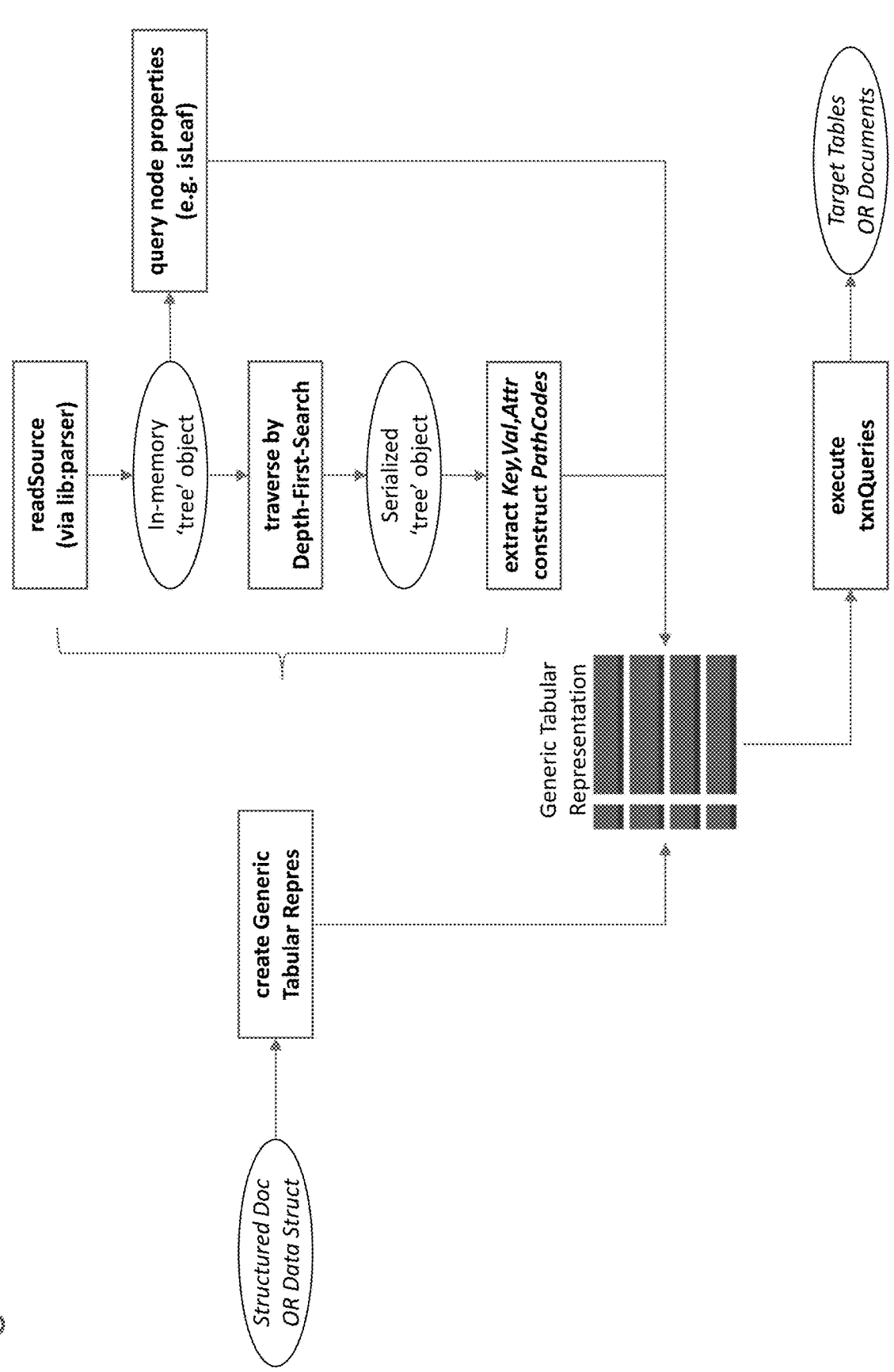
FIG. 1—Illustration of a workflow for ingesting data from structured documents or data structures into the universal data container of the invention, in the form of a generic tabular representation, queried for selecting content for populating disparate downstream tables or documents—the inset at the top right shows details of the 'create' operation—see also FIGS. 2 & 3.

As used herein, the following terms have the meaning defined here:

Data Integration is the process of combining data or knowledge items from disparate sources, generally in different formats, and representing them in a common data structure, preferably the generic tabular representation disclosed herein; this is in contrast to data virtualization or federation, described at 'wikipedia.org/wiki' under 'Federated_architecture';

Field, in the context of referring to the generic representation of the invention, is a synonym for Column;

f-Expression is a SQL-Expression implementing the equivalent of an XPath function for the generic tabular representation of the invention, such as the Common Table Expression disclosed herein implementing the equivalent of the XPath function 'contains', described at 'developer.mozilla.org/en-US/docs/Web' under 'XPath/Functions';

jCode is a declarative grammar, in JSON format, for configuring and orchestrating workflows for data sourcing, processing, formatting and publishing; jCode, and its interpreter, known as the jCode Machine ('JCM'), are described in jCodeDisclosure;

PathCode is a string encoding the unique path between nodes in a document tree, including: the relative path between a node, identified by that node's recordNo, i.e. the numeric row-index of the record for that node in the generic tabular representation of the invention, and the parentRecordNo, i.e. the recordNo of its parent node; the absolute path wherein one node is the root; for unstructured source documents, such as a table in CSV format, the reference node may be a virtual root, as illustrated in examples herein; for source documents in XML or HTML format, the PathCode is composed of dot-separated tag names;

p-Expression, aka RelationshipPrimitive, is a SQL-Expression implementing the equivalent of an XPath axis, for the generic tabular representation of the invention, including non-recursive Common Table Expressions; disclosed herein are p-Expressions for Ancestor-Or-Self, Ancestor, Parent, Preceding, Preceding-Sibling, Self, Following-Sibling, Following, Child, Descendant, Descendant-Or-Self, described at 'developer.mozilla.org/en-US/docs/Web' under 'XPath/Axes'; examples are available at 'w3schools.com/xml' under 'xpath_axes.asp'; the useful graphical illustration available at 'researchgate.net/figure' under 'XPath-Axes-Partition-from-Context-Node_fig2_29646041' shows that XPath axes partition the node set referencing a specified context node;

r-Expression, aka RelationshipExpression, is a SQL-Expression comprising one or more RelationshipPrimitives and optionally one or more f-Expressions, or additional user-defined primitives for navigating the generic tabular representation of the invention;

Sources are structured (that is: hierarchically organized) or unstructured documents or data structures derived therefrom, or otherwise provided, holding items of information, wherein items of information comprise items of data or knowledge (jCodeDisclosure) and wherein such sources may be of any of a multiplicity of types including but not limited to: reports, forms, tables, notably database tables or subsets thereof produced by queries, scalable vector graphics, API (='Application Programming Interface') payloads or web page sources; and in any of a multiplicity of formats including but not limited to, for structured documents: tagged formats (e.g. XML, HTML, SVG) and 'key: value pair' formats (e.g. JSON or YAML); and for unstructured documents: flat data tables (e.g. CSV, Excel) or serialized network graph representations (e.g. Turtle for RDF='Resource Description Framework') or plain text;

SQL-Expression is a generic term encompassing 'SQL statement', 'SQL query' and 'SQL expression', as these terms are formally defined, and, as applicable, SQL extensions, as these are described, for example at 'en.wikipedia.org/wiki' under 'SQL';

Standard SQL-Expression is a SQL-Expression conforming to the SQL (='Structured Query Language') standard, without language extensions, including Common Table Expressions aka CTE's;

t-Expression, aka Transformation Query, is a SQL-Expression for transforming the generic tabular representation of the invention; notably, all r-Expressions are t-Expressions; in one embodiment, a Transformation Query produces tabular output conforming to a schema of a target data table within a relational data model.

1. Utility

Universal Integration across Sources—In a first respect, the present invention discloses a universal data container, in the form of a generic representation, to hold content from disparate sources including but not limited to: files, streams, data bases, web pages, web services, or in-memory data structures, where file formats include, but are not limited to: tagged formats such as XML (=eXtensible Markup Language) and HTML (=HyperText Markup Language); 'key: value' formats such as JSON(=JavaScript Object Notation) or YAML (=Yet Another Markup Language); as well as domain-specific versions, such as SVG (=Scalable Vector Graphics), FHIR (=Fast Healthcare Interoperability Resources) or the RDF (=Resource Description Framework) triple store for representing network graphs; 'flat' (or un-nested) formats such CSV (=Comma Separated Values) tables, or free text.

Figure 2:
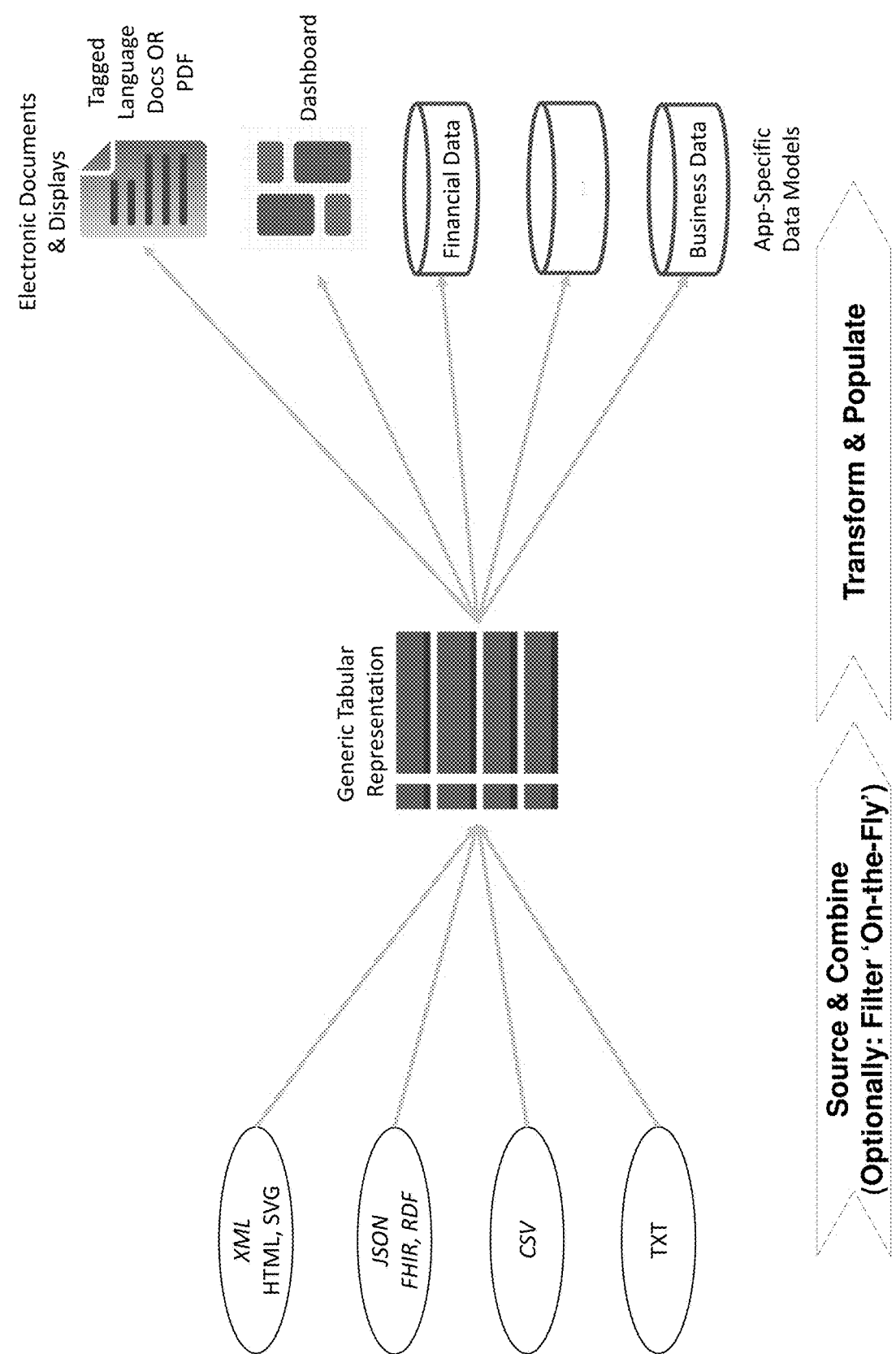
FIG. 2—Illustration of the generic tabular representation serving as the common intermediate representation of data from disparate sources, feeding application-specific relational data models, target documents or displays.
Figure 3:
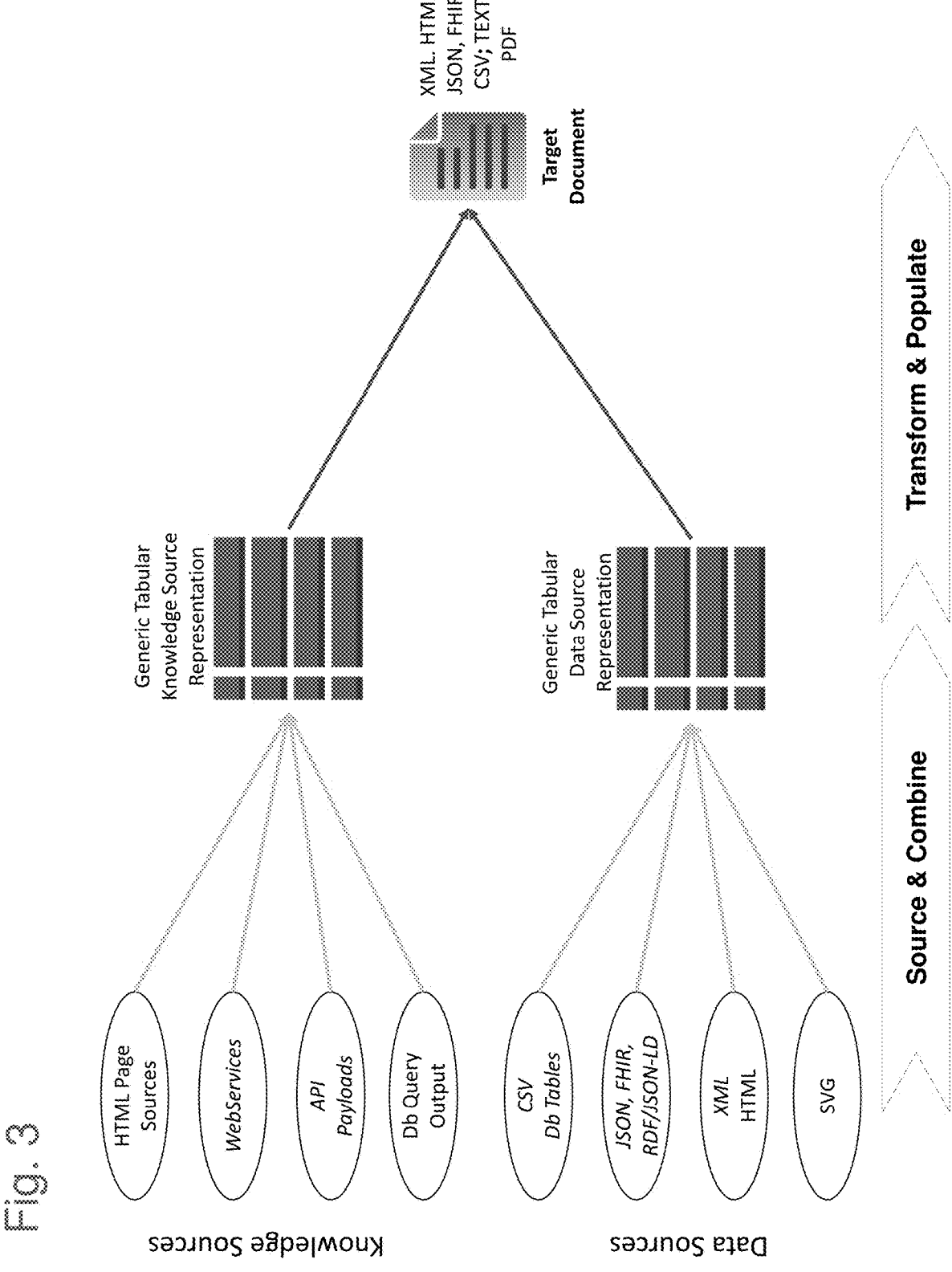
FIG. 3—Illustration of the generic tabular representation as a universal container for data as well as knowledge items from disparate sources, to facilitate populating a structured target document FIG. 4—Bar graph showing the number of up- or down-regulated genes by pathway (with abbreviated pathway names labeling the x-axis), created by rendering an SVG representation produced by invoking the R package 'svglite'—the SVG representation and its generic representation are discussed in Example 1.4
Figure 4:
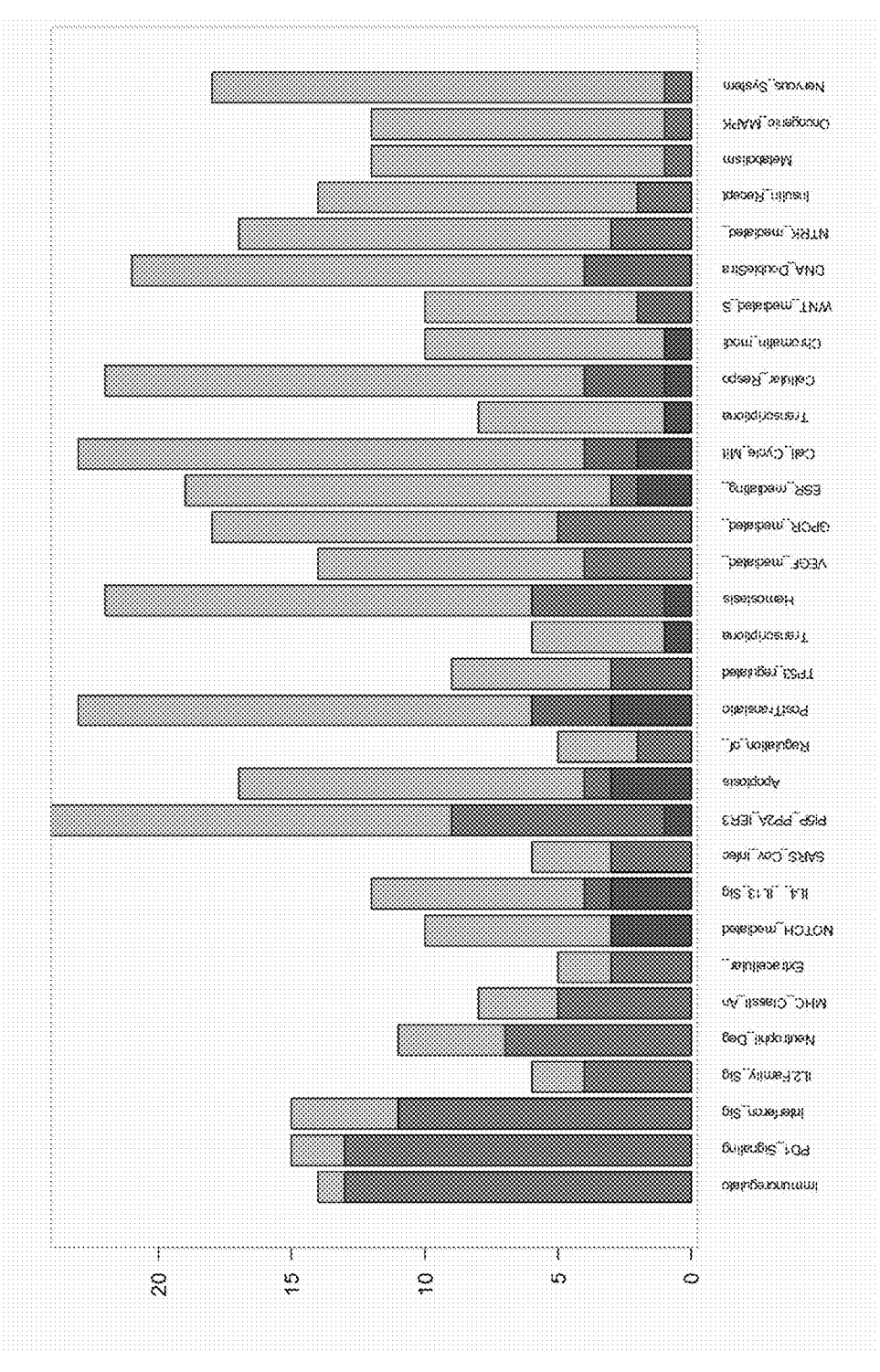

Generic tabular representations produced from an HTML page source, a FHIR Observation Resource, in JSON format, an RDF triple store, transformed from its original compressed Turtle format to a JSON-LD representation, as described at 'w3.org under TR' under 'rdf-json', and an SVG representation of the bargraph shown in FIG. 4 are described in Examples 1.1, 1.2, 1.3 and 1.4, respectively, and illustrated in corresponding FIGS. 1-4.

XML or JSON files themselves may represent content captured from different sources; an example would be an XML file populated with content captured by way of a web form that for 'Structured Data Entry' which is then ingested into the generic tabular representation of the invention, which, more generally, also would accommodate hierarchically organized models for representing 'Medical Narratives', as described in Los2004 ('OpenSDE: Row Modeling Applied to Generic Structured Data Entry', J Am Med Inform Assoc 2004 March-April; 11(2): 162-165; PMC353023).

Navigating & Querying the Universal Data Container: RelationshipPrimitives—In a further respect, the present invention discloses certain SQL query patterns for navigating and transforming the generic tabular representation, notably for selecting content of interest and transforming it to pre-specified downstream formats including pre-designated tables in a relational data model, or pre-designated structured documents (jCodeDisclosure), in accordance with the requirements of specific applications, regarding content and format of presentation, for human consumption or for transmission to electronic data systems.

In the general business setting, such applications may include the creation of reports or dashboards aggregating and presenting multi-modal data sourced from across a decentralized data architecture, as envisioned, for example, in the 'Data Mesh' concept, described at 'wikipedia.org/wiki' under 'Data_mesh'.

In the clinical setting, such applications may include the integration of results from complex molecular diagnostics. Thus, a single instance of the universal data container of the invention may combine content ingested, for example: from different laboratory tests, such as flow cytometry, reporting the immunophenotypes of tumor cells (after conversion of the native flow cytometry data format to CSV) and gene expression data from a dedicated instrument such 'Ncounter' (Nanostring, Seattle, WA) to facilitate querying disparate sources by directing queries to a single instance of the generic tabular representation; or observed data, provided in a CSV or XML file produced by a laboratory instrument, plus related knowledge items extracted from the HTML source of a web page, plus an SVG chart or graph produced from the data, plus an SVG QR Code identifying a patient, to provide a single source for populating a multi-modal report or feeding a dashboard by executing transformation queries, as disclosed herein and illustrated in FIGS. 2, 3 and 4.

PathCodes to Eliminate Recursion—Querying hierarchical source documents or data structures generally requires recursion, in order to capture relations defined by transitive closure; and while the introduction of Common Table Expressions facilitates their design, recursive SQL queries may incur considerable complexity when they are to replicate general XPath expressions.

As disclosed herein, PathCodes constructed during recursive traversal of source documents or data structure alleviate this problem and permit the implementation of RelationshipPrimitives, aka p-Expressions in standard SQL, without recursion.

A Lossless Representation—By default, the creation of the generic representation by recursive traversal is lossless, by capturing all content of the source, including, notably in for HTML sources, special control characters; this permits the recovery of the source document, as a special 'identity' transformation, for restoring, for example: SVG objects for rendering, or XML sources as inputs for third party analysis software.

In the special case of a CSV source document, the recovery of the original 'wide' table is readily accomplished by a SQL query pattern of 'chained self-joins' to implement what is in effect a 'pivot query', as illustrated in herein in 'Examples'. In the general case, the recovery of the source document may be accomplished by reconstructing the document tree by standard methods.

Accordingly, the generic representation of the invention preserves the structure of source documents.

A Generic Representation of Filtered Content—More generally, if source recovery is not required, memory requirements may be reduced, query performance enhanced, and downstream processing facilitated, by filtering the source material, wherein the latter may include the removal of special characters (such a newline or tabs in HTML sources) or removing all but specifically desired content, for example link elements in an HTML page source with an href attribute specifying the location of an external resource in the form of a URL. Accordingly, in one embodiment, the creation of the generic representation by recursive traversal comprises filtering or transforming the source content.

An EventStore—In another embodiment, the generic representation of the invention is operated as an append-only data structure, by generating and recording an encoded time stamp marking the insertion of new content, or updates of existing content, as elaborated below.

An Intermediate Representation: 'Many:To:Many' Mapping—By way of the universal data container of the invention, disparate sources are mapped to a common intermediate representation which may be held in memory, as a temporary table or tables, preferably in a SQLite database, or it may be committed to persistent storage using any standard relational database manager including MSSQL or MySQL. This intermediate representation serves as the common source for populating downstream data tables or documents, as illustrated in FIGS. 1, 2 and 3.

In its function as an 'intermediate' representation, the generic tabular representation of the invention may be considered, in the context of data integration and transformation, the analog of an 'intermediate language', such as p-code or Java byte code, in compiling source code to a common intermediate representation for producing executables, as described at 'encyclopedia2.thefreedictionary.com' under 'intermediate language'.

In preferred embodiments, the generic tabular representation is a light-weight temporary in-memory data structure in data analysis workflows that call for the real-time integration of disparate data sources in a decentralized data architecture, that facilitates the transformation of content from disparate sources for populating tables in (persistent) target relational (or other) data bases as well as hierarchical information products presenting data and knowledge items (jCodeDisclosure).

In one embodiment of the latter variety, outputs in multiple formats may be created by extracting from the generic tabular representation content of interest for populating an XML 'template', then transforming the completed XML template to disparate output formats, such as transformed XML including HTML, or JSON, CSV and even PDF, by invoking XSL-T and, in the latter case, XSL-FO; in a preferred embodiment, workflows implementing "Many: to: Many" mappings of this type are configured and executed under the control of jCode.

2. Creation

In a preferred embodiment, the generic tabular representation of the invention is created by recursive traversal of an in-memory representation of a source document or data structure.

For XML and HTML documents, the in-memory representation is that of the Document Object Model ('DOM'), and one embodiment comprises DOM parsers in C #libraries: for XML, 'LINQto XML', which provides an in-memory XML programming interface described at 'learn-.microsoft.com/en-us/dotnet/standard' under 'linq/linq-xml-overview'; and for HTML, 'HtmlAgilityPack', available at nuget.org. For JSON documents, and documents in related 'key:value pair' formats, the in-memory representation similarly is an object representing a tree graph, and one embodiment comprises the parser 'LINQ to JSON', in the 'Newtonsoft.JSON' C #library, available at nuget.org. In all cases, the graph may be navigated, and its nodes and their properties inspected, by appropriate method calls, for example so as to determine the 'leaf' status of individual nodes, for inclusion in the generic tabular representation.

For CSV documents, the content is mapped to an in-memory table, in one embodiment by invoking the C #library 'CsvHelper', available at nuget.org, and this table then is converted to a JSON object.

For TXT documents representing plain unstructured text data sources, the content is first mapped to a table with a pre-set number of fields, to record: an auto-generated id, a generic tag name and a value, which is the string contained in the text data source, such that each text data source is represented as a single row in this table; this table, or a designated subset thereof, then is converted to a JSON object. TXT documents representing informally structured text data sources, wherein text is organized in accordance headings and sections at multiple levels, such as in documents created by 'markdown', described at 'markdownguide.org', for example for documenting source code, are mapped directly to a JSON object of corresponding structure.

In one embodiment, the construction of the generic tabular representation is orchestrated by jCode Import Directives (see also 'jCode Disclosure')

In contrast to the widely used methods of parsing source documents or data structures by mapping to object classes, as disclosed, for example, in the aforementioned US20170011035A1, the creation of the generic representation of the invention proceeds without reference to a schema description of the source document or data structure.

'Streaming' & Real-Time Operations on Data Streams— In one embodiment, the steps of first generating an in-memory representation of the source, then constructing the generic representation by recursive traversal of that in-memory representation, and finally querying this representation, may be interleaved, by filtering or otherwise transforming an incoming data stream, produced by incremental SAX (=Simple API for XML) or StAX (=Streaming API for XML) parsers that provide notifications when encountering specific 'events', for example a pre-specified pattern of content, such as specific tag or attribute names. Filtering or transforming the incoming data stream, and creating a generic representation of the filtered or transformed source reduces memory requirements and enhances query performance.

Such event monitoring may be used, for example, to answer the question as to whether or not the hierarchical structure of an XML or HTML source document is at least 'n' layers deep, by updating the maximum value of 'level' and stopping when this value reaches 'n'; or to capture only the value of pre-specified attributes, such as the URL's of external resources; these may be placed into a simple CSV table which then is transformed to the generic representation and stored, rather than retaining the potentially large original source.

Temporary or Persistent Container—The query-able universal data container of the invention may be temporary or persistent. In a preferred embodiment, temporary storage is provided in the form of an in-memory SQLite database, which also facilitates the deployment of the data container of the invention in applications designed for mobile devices; persistent storage may be provided in any common database format including but not limited to SQLite, MySQL, Microsoft SQL Server.

3. Structure

The generic representation of the invention is based on modeling rows, as in Los2004 ('OpenSDE: Row Modeling Applied to Generic Structured Data Entry', J Am Med Inform Assoc 2004 March-April; 11(2): 162-165; PMC353023), rather than columns, as in relational data models with their normal forms, and requires no application-specific relational schema; it provides a serialized representation that, in the absence of filtering, described above, preserves the structure of source documents or data structures so that these may be restored.

The generic representation of the invention comprises fields to hold names, attributes and content of elements in source documents provided in tagged file formats, such as XML or HTML, or keys and values in source documents provided in key:value pair formats such as JSON, and one or more fields to hold PathCodes for nodes in the tree graph describing the structure of the source document or data structure.

In a preferred embodiment, the generic tabular representation comprises fields to record:

recordNo—a unique numeric row-index for each record: in a preferred embodiment, recordNos are successive integers, with 0 assigned to the root of the document tree;

parentRecordNo—the recordNo of the parent of the current record; in a preferred embodiment, the root is assigned the parentRecordNo '-1';

propPath—a PathCode representing the dot-separated absolute path to an element node in a document tree; for tagged formats, such as XML or HTML, an element node is identified by a tag (which is matched by a closing tag), and each path recorded in propPath comprises concatenated tag names; for JSON and similar key:value pair formats, the path comprises concatenated keys; in XML/HTML, attributes, <tag attr="attrValue" . . . >, are assigned the propPath of the element node, and are recorded in rows immediately following the record for that element node; in a preferred embodiment, text values, enclosed by paired tags, are treated as a child of the element node, are assigned the propPath of the element node, extended by the suffix '#text', and are separately recorded, with an entry in the propValue field, in a row following the element node and its attributes (if any); in some embodiments, propPath also may comprise a numeric index, within square brackets, to resolve sibling elements; for XML documents, the function 'xml_path', in the R package 'xml2', available at 'cran.org', returns a path akin to propPath;

uniquePropPath—a string representing a numeric encoding of the absolute path to a node, comprising dot-separated elements of the form 'level-recordNo' such as '0-0.1-3.2-188.3-196.4-221.5-3919.6-3924.7-3983.8-4763.9-4775.10-4777'; this code facilitates the design of query patterns notably including RelationshipPrimitives, as disclosed herein and illustrated in Examples; the uniquePropertyPath has a resolution at least equal to that of the corresponding propPath;

Key or propKey—for XML/HTML sources, this is the tag name, and for each tag attribute, the string tag.attr, thus: div and div.class; a and a.id or a.href, etc; textual content is treated like a tag, identified by #text, as a suffix of the corresponding entry in propPath, as illustrated in Table 1, while the value of #text is recorded in propVal (below); for JSON and similar key:value pair formats, this is the key; in some embodiments, when propPath ends in a numeric index, propKey may be an index.

key:value pair format; in contrast to the 'Entity-Attribute-Value' (or 'E-A-V') data model, the Key field of the generic tabular representation holds, for source documents in tagged formats, names of elements as well as attributes, and for JSON documents (and sources in related key:value formats), the names of keys; while Attribute, when present, holds content, notably text value, embedded within pairs of tags.

Preferably, the generic tabular representation also records:

level—for each node in the document tree, this is an integer representing the number of edges along the unique path from the root to that node; attributes are assigned the level of the element node;

isContainerNode (or simply ContainerNode), aka isLeaf—is a binary variable indicating whether (=1) or not (=0) a node is a leaf in the document tree; by definition, a leaf is a node without descendants; while level and 'isContainerNode' in principle may be determined from the uniquePropPath, this determination preferably is performed in code, during recursive traversal of the source document or data structure, thereby obviating the need for (generally recursive) SQL queries to that end.

Examples of generic tabular representations conforming to this structure are shown in Examples 1.1-1.4.

AdditionalFields—In preferred embodiments, the generic representation also may comprise one or more fields to record:

a sourceDocumentIdentifier identifying the source document or data structure, where this field permits the identification of entries in an instance of the generic representation of the invention holding content from two or more sources.

a timeStamp to mark the date and time of inserting new (or updating existing) content, the time-stamp preferably encoded in a numeric format; and For the special case of a source document in the form of a 'flat' CSV table, each record is a child of the (virtual) root, so that records are siblings, and each column in the source table is treated as an element labeled by a uniquePropPath; this is further described in Sect. 4.1, below.

Auxiliary Tables—In some embodiments, an instance of the generic representation of the invention may be linked to auxiliary tables providing additional information regarding

TABLE 1

| propPath | propkey |
|---|---|
| html.body.div.div.div.div.div.div.article.div.div.div.div.div.ul.li | li |
| html.body.div.div.div.div.div.div.article.div.div.div.div.div.ul.li.strong | strong |
| html.body.div.div.div.div.div.div.article.div.div.div.div.div.ul.li.strong.a | a |
| html.body.div.div.div.div.div.div.article.div.div.div.div.div.ul.li.strong.a | a.class |
| html.body.div.div.div.div.div.div.article.div.div.div.div.div.ul.li.strong.a | a.href |
| html.body.div.div.div.div.div.div.article.div.div.div.div.div.ul.li.strong.a | a.onclick |
| html.body.div.div.div.div.div.div.article.div.div.div.div.div.ul.li.strong.a.#text | #text | textValue or propVal—for XML/HTML, this is the textual value enclosed by <tag . . . > and </tag>, with a propPath ending in #text; in some cases, #text may tag 'invisible' content (such as control characters, which optionally may be removed during traversal); otherwise, this field is empty; for JSON and similar key:value pair formats, this field records values;

Attribute or propAttr—for XML/HTML, this is the value of attributes, if any; by default, this field is omitted when no entries are specified in a given source document or data structure, as in sources of JSON or similar terms referenced in the principal table. Links to such auxiliary tables may be accommodated in additional fields of the Generic Tabular Representation.

4. Navigation & Transformation

The utility of the generic tabular representation of the invention as the preferred realization of a universal data container is substantially enhanced by a providing SQL-Expressions, in accordance with certain patterns, as disclosed herein, for navigating and transforming the generic tabular representation; a basic example for extracting information about node sets in the representation of a structured document is that of identifying leaves, by referencing the isContainer entry, as illustrated in Example 2.1. As with queries to relational database models, the query patterns disclosed here may be deployed to create 'views'.

This aspect of the invention obviates the need for special XML or JSON data types, or that for SQL extensions to handle XPath expressions, as in, for example, 'PostGreSQL', or format-specific query languages for structured documents such as XQuery, described at 'w3.org/TR' under 'xquery-30' or JSONQuery, described at 'jsonquery.co.uk'.

4.1 Transformation Queries: Chained Self-Joins

To transform selected content from the generic representation of the invention into the form of a table comprising attributes rows, as in the 'wide' format of a CSV table, or a table in a relational data model wherein the fields express relations between the elements of records, queries preferably are designed in the form of Chained Self-Joins. This is illustrated in Example 2.2.1. In the special case of a CSV source document, the recovery of the original 'wide' table is readily accomplished by a SQL query pattern of 'chained self-joins' to implement what is in effect a 'pivot query', as illustrated in Example 2.2.2.

4.2 r-Expressions

To query the generic tabular representation, the present invention discloses r-Expressions, which correspond to XPath expressions and include p-Expressions, aka RelationshipPrimitives, which correspond to XPath axes, and f-Expressions, which correspond to XPath functions.

4.2.1 Implementing RelationshipPrimitives as Standard SQLExpressions

Example 2.3 provides RelationshipPrimitives corresponding to the complete set of XPath axes, in the form of Common Table Expressions, here applied to the generic representation of the HTML source of the National Cancer Institute web page entitled 'List of Targeted Therapy Drugs Approved for Specific Types of Cancer'.

As with XPath axes, RelationshipPrimitives reference a context node, identified by specifying the absolute path to the node, or preferably by specifying node attributes which may include predicates; to this end, the present invention discloses an f-Expression that is functionally equivalent to the XPath function 'contains', defined at 'developer.mozilla.org/en-US/docs/Web' under 'XPath/Functions/contains'. In a preferred embodiment, r-Expressions are provided in the form of non-recursive parametrized Common Table Expressions ('CTE's), wherein substitution variables are delimited by '_@' and '@_'; thus, to select a context node, by specifying attribute predicates, the f-Expression emulating the XPath function 'contains' has the form as in Table 2 below:

TABLE 2

```
WITH containsAttr AS (SELECT * FROM _@genRep_name@_
    WHERE propKey = _ @contextNode_attr@_
    AND propAttr=_@contextNode_attrVal@_),
contextNode AS (SELECT * FROM _@genRep_name@_
    WHERE recordNo = _@contextNode_recordNo@_)
```

To recover the corresponding instantiated expressions in Example 2.3, replace the substitution variables by these values:

```
_@gistRep_name@_ = NCI_targeted_therapy_drugs'
_@contextNode_attr@_ = 'div.class'
_@contextNode_attrVal@_ = 'accordion'
and
_@contextNode_recordNo@_ = 'SELECT parentRecordNo FROM containsAttr'
```

The simple query
SELECT * FROM contextNode
then returns the desired contextNode; in the second CTE above, the substitution _@contextNode_recordNo@_='SELECT parentRecordNo FROM containsAttr' reflects the configuration of the generic tabular representation, wherein the record holding the attribute targeted by the first CTE above is linked to the node by way of its parentRecordNo.

Parametrized expression for any of the RelationshipPrimitives referencing the context node, conform to the same pattern, as illustrated here for Ancestor (where '-' indicates a comment) as in Table 3 below:

TABLE 3

```
ancestor AS (SELECT * FROM _@genRep_name@_
    WHERE INSTR((SELECT uniquePropPath FROM
    _@contextNode@_),uniquePropPath) > 0
    AND level < (SELECT level FROM _@contextNode@_) – exclude 'self'
    AND containerNode = 0 -- exclude leaves
    AND recordNo > 0 – exclude root
    AND propAttr IS NULL)
```

The following substitutions recover the corresponding expression in Example 2.3:

```
_@gistRep_name@_ = 'NCI_targeted_therapy_drugs'
_@contextNode@_ = 'contextNode'
```

An r-Expression in the form of chained CTE's, comprising an f-Expression for specifying the context node and a p-Expression (aka RelationshipPrimitive) for selecting a node set, may be evaluated by executing a query such as:
SELECT * FROM ancestor WHERE propKey IN
   (_@attr@_)
which is itself parametrized, and may be instantiated by _@attr@_='div' to recover the expression for Ancestor in Example 2.3.

Similarly, for Descendant, it may as shown in Table 4 below:

TABLE 4

```
descendant AS (SELECT * FROM _@genRep_name@_
    WHERE INSTR(uniquePropPath,(SELECT uniquePropPath FROM
    _@contextNode@_)) > 0
    AND level > (SELECT level FROM _@contextNode@_) -- exclude self
    AND propAttr IS NULL)
```

The substitutions above recover the corresponding expression in Example 2.3.

Accordingly, the typical pattern of an r-Expression emulating an XPath expression invoking a single XPath axis comprises: a pair of CTEs implementing the f-Expression emulating the XPath function 'contains' for specifying a contextNode; one CTE implementing a p-Expression (aka RelationshipPrimitive), and a query to evaluate the r-Expression, e.g. for the Descendant set, with propKey 'ul', may be as shown in Table 5 below:

TABLE 5

```
WITH containsAttr AS (SELECT * FROM NCI_targeted_therapy_drugs
    WHERE propKey = 'div.class' AND propAttr = 'accordion'),
contextNode AS (SELECT * FROM NCI_targeted_therapy_drugs
    WHERE recordNo = (SELECT parentRecordNo FROM containsAttr)),
descendant AS (SELECT * FROM NCI_targeted_therapy_drugs
    WHERE INSTR(uniquePropPath,(SELECT uniquePropPath FROM contextNode)) > 0
        AND level > (SELECT level FROM contextNode)
        AND propAttr IS NULL)
SELECT * FROM descendant WHERE propKey = 'ul'
```

More complex r-Expressions, invoking more than a single RelationshipPrimitive, are implemented by chaining the desired p-Expressions, in the manner illustrated in Example 2.4.1 Referencing uniquePropPath to Eliminate Recursion— While certain relations expressed as XPath axes are defined in terms of transitive closure, notably: Ancestor=Parent of Parent of . . . and Descendant=Child of Child of . . . , RelationshipPrimitives are here implemented without recursion, namely by taking advantage of the Ancestor and Descendant relations encoded in uniquePropPath.

That is: the uniquePropPath of any Ancestor node of a specified context node—but NOT that of any node Preceding—must be a prefix of the uniquePropPath of the context node; conversely, the uniquePropPath of a specified context node must appear as a prefix in the uniquePropPath of any Descendant node—but NOT in that of any node Following; accordingly, in the expression for Descendant, above, the order of the arguments to INSTR, in the first condition of the WHERE clause, is inverted with respect to that in the corresponding condition in the expression for Ancestor. This is further illustrated in Example 2.4.

f-Expressions Corresponding To Other XPath Functions—The SQL-Expressions described above, and in Examples 2.3 and 2.4, reference a context node that is specified by an f-Expression emulating the XPath function 'contains'. Beyond 'contains', other XPath functions defined in the W3C standard, specifically, many of the 'Accessor Functions', 'Functions on Numeric Values', 'Functions on Strings', 'Functions on Boolean Values', and certain 'Functions on Durations, 'Dates and Times' and 'Functions on Nodes', described at 'w3schools.com/xml' under 'xsl_functions.asp' may be implemented using Standard SQL Expressions.

4.2.2 Other Implementations of r-Expressions 4.2.2.1 Via User-Defined SQL Functions In other embodiments, r-Expressions may be implemented in the form of user-defined SQL functions. This is illustrated in Example 2.6 for the RelationshipPrimitives described in Examples 2.3 and 2.4.

In a preferred embodiment, user-defined SQL functions are C #functions for SQLite, and these are implemented and deployed byway of the Microsoft.Data.Sqlite.NET library, acting as a bridge between C #and SQLite as described at 'learn.microsoft.com' under 'sqlite/user-defined-functions'. Example 2.5 illustrates the definition and use of such functions to produce a compact SQL-Expression, as an alternative to the chained CTE's in Alternative 1 of Example 2.4.1, for specifying a context node and selecting the Descendant of that context node's Parent node set with a specific attribute recorded in propKey. SQLite functions implementing other RelationshipPrimitives and r-Expressions may be defined and deployed in like fashion.

More generally, in other embodiments, SQL functions may be defined to access other fields of the generic tabular representation.

4.2.2.2 Via Stored Procedures or Functions

In further embodiments, r-Expressions may be implemented in the form of stored procedures or stored functions in any target database system, including but not limited to MySQL, PostGreSQL, MicroSoft SQLServer.

4.2.3 Invoking r-Expressions in jCode

In a preferred embodiment, r-Expressions are invoked, where necessary instantiated and executed in accordance with jCode Directives (jCodeDisclosure). Accordingly, in the case of user-defined SQLite functions, whenever a jCode Directive opens a connection to a SQLite database embedded in the jCode Machine, the jCodeMachine registers the user-defined functions with the database connection, as per the contract between the Microsoft.Data.Sqlite library and the library client, for example, as shown in Table 6A below:

TABLE 6A

```
if (databaseTypeField.Equals("SQLite"))
{
    sqliteDatabaseConnection = new SqliteConnection(connectionStringField);
```

TABLE 6A-continued

```
    databaseConnection = sqliteDatabaseConnection;
    RelationshipPrimitive.AddGetContextNode(sqliteDatabaseConnection,
        new string[ ] {"CONTEXTNODE", "cNODE"});
    RelationshipPrimitive.AddAncestorPrimitive(sqliteDatabaseConnection,
        new string[ ] {"ANCESTOR", "pANC"});
    RelationshipPrimitive.AddParentPrimitive(sqliteDatabaseConnection,
        new string[ ] {"PARENT", "pPRN"});
    RelationshipPrimitive.AddDescendantPrimitive(sqliteDatabaseConnection,
        new string[ ] {"DESCENDANT", "pDSC"});
}
```

Here, each new function is registered under a long name and under an abbreviated name, of which either may be used in SQL statements. The Add< . . . > functions are implemented without recursion by referencing the uniqueProp-Path of the generic tabular representation; these functions may be of aggregate or scalar type, in accordance with 'microsoft.com/en-us/dotnet/standard/data' under 'sqlite/user-defined-functions', which provides detail regarding the definition and execution model of both types of functions in C #.

4.2.4 Instantiatiating and Executing r-Expressions in a High-Level Host Language: R In a preferred embodiment, r-Expressions, preferably in the form of parametrized Common Table Expressions, are invoked in any high-level host language that supports string concatenation and at least an 'sprintf' or equivalent function to instantiate these Common Table Expressions. Thus, Example 2.6 illustrates an implementation of r-Expressions invoking the RelationshipPrimitives Ancestor and Descendant—that is: creating and instantiating the corresponding parametrized CTE's, disclosed herein, and executing the resulting queries—in R (R Core Team (2020). R: A language and environment for statistical computing. R Foundation for Statistical Computing, Vienna, Austria).

4.2.5 Modifying Nodes

In a further respect, node sets selected by r-Expressions may be modified using standard SQL UPDATEqueries. Preferably, these will modify, in addition to the content of selected records, the timeStamp entry; this may include the addition of a suffix to the timeStamp to indicate that an UPDATE operation has been performed.

4.3 Operating an Event Store

In a preferred embodiment, the generic tabular representation of the invention is operated as an append-only structure. For example, records from periodic health checkups may be accumulated in the same instance of a generic representation, and may then be queried to extract trends, such as the temporal evolution of hdlc levels in Example 1.1.

In such a data structure, there is no DELETE operation. That is, if the content of an entire source in an instance of the generic representation is to be superseded by content from a modified or new source, then the new content is appended, with its own timeStamp, and the superseded content is marked as InActive, either by appending a suffix to the timeStamp, or by recording the Active/InActive status in an optional new field. More generally, the UPDATE operation for individual records is replaced by an operation that marks the targeted existing record(s) as InActive and inserts or appends the new records(s) under the same recordNo, parentRecordNo, propPath and uniquePropPath as the original record(s).

EXAMPLES

1 Structure of the Generic Tabular Representation for Disparate Sources
1.1 HTML Source Document FIG. 5 shows a section of the generic tabular representation of the HTML source of the 'professional' web page for 'osimertinib', at 'dailymed.nlm.nih.gov' under 'dailymed/drugInfo.cfm', last updated on Oct. 21, 2022, where the URL for this 'dailymed' page appears on the page for this targeted therapy for lung cancer on the National Cancer Institute 'List of Targeted Therapy Drugs Approved for Specific Types of Cancer'; this 'dailymed' page provides the FDA drug label information ("package insert") for this particular therapeutic agent, and the content extracted pertains to Section 1.1, which is identified by propAttr='anch_dj_dj-dj_3', and an attribute node, with propKey='a' and attribute values 'a.href', 'a.id', and 'a.class'.

1.2 FHIR Source Document, in JSON Format

This FHIR Observation Resource, defined at 'hl7.org' under 'fhir/observation.html', in JSON format, reports results of an hdlc ('high-density lipoprotein cholesterol') panel, commonly ordered for periodic health check-ups, may be as shown in Table 6B below:

TABLE 6B

```
{
    "status" : "final",
    "valueQuantity" : {
        "code" : "mg/dL",
        "system" : "http://unitsofmeasure.org",
        "value" : 68,
        "unit" : "mg/dL"},
    "category" : {
        "text" : "Laboratory",
        "coding" : [
            {
                "system" : "http://hl7.org/fhir/observation-category",
                "display" : "Laboratory",
                "code" : "laboratory" }] },
    "id" : "ResultObservation-131681021",
    "code" : {
        "text" : "HDLC" },
    "referenceRange" : [
        {
            "low" : {
                "value" : 40,
                "unit" : "mg/dL"},
            "high" : {
                "value" : 59,
                "unit" : "mg/dL" },
            "meaning" : {
                "text" : "40-59" } } ],
    "subject" : {
        "reference" : "Patient/6231773" },
    "effectiveDateTime" : "2021-07-16T13:20:00-04:00",
    "resourceType" : "Observation" }
```

17

The generic tabular representation is shown in FIG. 6, where some of the PathCodes in propPath also comprise an index, here [0], which, if it is a suffix, also appears in propKey.

Time Series—From a generic tabular representation holding multiple instances of this type of content, recorded at successive times, with corresponding entries in timeStamp field, and preferably also in a uniqueSourceDocumentIdentifier field, a time series for the temporal evolution of the hdlc level, recorded under propKey=valueQuantity.value, would be readily constructed by a simple SQL query to enable the display and analysis of trends.

1.3 Generic Representation for RDF Triple Store Source, in (Compressed) Turtle Format This RDF triple store, provided in compressed Turtle format for an introductory an example of a network graph, at 'stardog.com/tutorials' under 'rdf-graph-data-model' as shown in Table 7 below:

TABLE 7

```
:The_Beatles                    a :Band ;
    :name "The Beatles" ;
    :member :John_Lennon , :Paul_McCartney , :George_Harrison , :Ringo_Starr .
:John_Lennon                    a :SoloArtist .
:Paul_McCartney                 a :SoloArtist .
:Ringo_Starr                    a :SoloArtist .
:George_Harrison                a :SoloArtist .
:Please_Please_Me                 a :Album ;
    :name "Please Please Me" ;
    :date "1963-03-22"^^xsd:date ;
    :artist :The_Beatles ;
    :track :Love_Me_Do .
:Love_Me_Do                     a :Song ;
    :name "Love Me Do" ;
    :length 125 ;
    :writer :John_Lennon , :Paul_McCartney .
``` was converted to JSON-LD (='JSON for Linking Data') in accordance with the prescription at 'w3.org/TR' under 'JSON Alternative Serialization (RDF/JSON)' using an online tool such as that provided at foxinfotech.in/2022/04 under 'turtle-to-jsonld.html' as shown in Table 8 below:

TABLE 8

```
{
    "@context": {
        "0": "http://stardog.com/tutorial/",
        "rdf": "http://www.w3.org/1999/02/22-rdf-syntax-ns#",
        "xsd": "http://www.w3.org/2001/XMLSchema#"},
    "@graph": [
        {
            "@id": "0:The_Beatles",
            "@type": "0:Band",
            "0:name": "The Beatles",
            "0:member": [
                {
                    "@id": "0:John_Lennon"},
                {
                    "@id": "0:Paul_McCartney"},
                {
                    "@id": "0:George_Harrison"},
                {
                    "@id": "0:Ringo_Starr" } ]},
        {
            "@id": "0:John_Lennon",
            "@type": "0:SoloArtist" },
        {
            "@id": "0:Paul_McCartney",
            "@type": "0:SoloArtist" },
        {
            "@id": "0:Ringo_Starr",
            "@type": "0:SoloArtist" },
```

18

TABLE 8-continued

```
        {
            "@id": "0:George_Harrison",
            "@type": "0:SoloArtist" },
        {
            "@id": "0:Please_Please_Me",
            "@type": "0:Album",
            "0:name": "Please Please Me",
            "0:date": {
                "@value": "1963-03-22"
                "@type": "xsd:date"},
            "0:artist": {
                "@id": "0:The_Beatles"},
            "0:track": {
                "@id": "0:Love_Me_Do" } },
        {
            "@id": "0:Love_Me_Do",
            "@type": "0:Song",
            "0:name": "Love Me Do",
```

TABLE 8-continued

```
            "0:length": 125,
            "0:writer": [
                {
                    "@id": "0:John_Lennon" },
                {
                    "@id": "0:Paul_McCartney" }
            ]} ]}
```

Recursive traversal produces the generic tabular representation in FIG. 7—once again, several entries in propKey comprise an index that, when it is the suffix of propKey, also appears in propValue.

1.4 Generic Representation for an SVG 'Bargraph' Object

The bargraph in FIG. 4 was produced by rendering an SVG file, created by invoking the R package 'svglite' (obtained from the Comprehensive R Archive Network, 'CRAN') and shown in sections in Table 9 below, to display the results of a certain analysis of gene expression data.

TABLE 9

```
<?xml version='1.0' encoding='UTF-8' ?>
<svg xmlns='http://www.w3.org/2000/svg' xmlns:xlink='http://www.w3.org/1999/xlink'
class='svglite' width='792.00pt' height='504.00pt' viewBox='0 0 792.00 504.00'>
<defs>
    <style type='text/css'> <![CDATA[
        .svglite line, .svglite polyline, .svglite polygon, .svglite path, .svglite rect, .svglite circle {
            fill: none;
            stroke: #000000;
            stroke-linecap: round;
            stroke-linejoin: round;
            stroke-miterlimit: 10.00;
        }
        .svglite text {
            white-space: pre;
        }
    ]]></style>
</defs>
<rect width='100%' height='100%' style='stroke: none; fill: #FFFFF0;'/>
<defs>
    <clipPath id='cpMC4wMHw3OTIuMDB8MC4wMHw1MDQuMDA='>
        <rect x='0.00' y='0.00' width='792.00' height='504.00' />
    </clipPath>
</defs>
<g clip-path='url(#cpMC4wMHw3OTIuMDB8MC4wMHw1MDQuMDA=)'>
<rect x='85.07' y='183.51' width='17.59' height='214.57' style='stroke-width: 0.75; fill:
#808080; fill-opacity: 0.50;' />
<rect x='106.17' y='168.18' width='17.59' height='229.90' style='stroke-width: 0.75; fill:
#808080; fill-opacity: 0.50;' />
<rect x='127.27' y='168.18' width='17.59' height='229.90' style='stroke-width: 0.75; fill:
#808080; fill-opacity: 0.50;' />
<rect x='148.37' y='306.12' width='17.59' height='91.96' style='stroke-width: 0.75; fill:
#808080; fill-opacity: 0.50;' />
<rect x='169.48' y='229.49' width='17.59' height='168.59' style='stroke-width: 0.75; fill:
#808080; fill-opacity: 0.50;' />
<rect x='190.58' y='275.47' width='17.59' height='122.61' style='stroke-width: 0.75; fill:
#808080; fill-opacity: 0.50;' />
...
<text transform='translate(96.86,416.16) rotate(-90)' text-anchor='end' style='font-size:
8.40px; font-family: "Arial";' textLength='60.62px'
lengthAdjust='spacingAndGlyphs'>Immunoregulato</text>
<text transform='translate(117.96,416.16) rotate(-90)' text-anchor='end' style='font-size:
8.40px; font-family: "Arial";' textLength='55.50px'
lengthAdjust='spacingAndGlyphs'>PD1_Signaling</text>
<text transform='translate(139.07,416.16) rotate(-90)' text-anchor='end' style='font-size:
8.40px; font-family: "Arial";' textLength='52.70px'
lengthAdjust='spacingAndGlyphs'>Interferon_Sig</text>
<text transform='translate(160.17,416.16) rotate(-90)' text-anchor='end' style='font-size:
8.40px; font-family: "Arial";' textLength='55.49px'
lengthAdjust='spacingAndGlyphs'>IL2.Family_Sig</text>
<text transform='translate(181.27,416.16) rotate(-90)' text-anchor='end' style='font-size:
8.40px; font-family: "Arial";' textLength='58.29px'
lengthAdjust='spacingAndGlyphs'>Neutrophil_Deg</text>
<text transform='translate(202.38,416.16) rotate(-90)' text-anchor='end' style='font-size:
8.40px; font-family: "Arial";' textLength='64.33px'
lengthAdjust='spacingAndGlyphs'>MHC_ClassII_An</text>
...
<polygon points='59.04,401.76 761.76,401.76 761.76,30.24 59.04,30.24 ' style='stroke-width:
0.75; stroke: #BEBEBE;' />
</g>
</svg>
```

The SVG file was ingested, and its content converted to the generic representation in FIG. 8.

2 Navigating & Transforming the Generic Tabular Representation of the Invention

2.1 Identifying Leaf Nodes

Having recorded the node status by querying the in-memory representation of the original source document, as disclosed, this is a simple matter, conditioning on isContainer of the generic tabular representation, namely:

```
SELECT propPath, propKey, propVal FROM TableName
    WHERE isContainerNode=1
```

2.2 Transformation by Chained Self-Joins

Chained Self-Joins represent a pattern of SQL-Expressions for transforming the generic tabular representation into a 'wide' table comprising rows of attributes.

2.2.1 Transforming Selected Content to 'Wide' Table Format

The following transformation query, which conforms to this pattern, extracts from the generic tabular representation of the HTML source of the National Cancer Institute web page entitled 'List of Targeted Therapy Drugs Approved for Specific Types of Cancer' (which, for the version of the page last updated in Oct. 31, 2022, contained 8,229 records), a 2-column table of approved targeted therapies by condition, as shown in Table 10 below:

TABLE 10

```
SELECT
    a.propVal AS Condition,
    b.propVal AS Approved_Targeted_Therapy
FROM Vars_NCI_targeted_therapy_drugs a
JOIN Vars_NCI_targeted_therapy_drugs b
    ON INSTR(a.propPath,'section.h2.p.#text') > 0 AND
    INSTR(b.propPath,'section.ul.li.a.#text') > 0 AND
    INSTR(('14-' | | b.uniquePropPath),a.parentRecordNo+4) > 0
--WHERE INSTR(Condition,'bladder cancer') > 0 – optional condition
```

The top section of the output table, with fields 'Condition' and 'Approved_Targeted_Therapy', is shown in FIG. 9.

2.2.2 'Pivot' Query for Recovering CSV Source

This pattern also lends itself to the implementation of a 'pivot query' for recovering, from the generic tabular representation in FIG. 10, holding data extracted from the listing of approved targeted therapies on the National Cancer Institute web page entitled 'List of Targeted Therapy Drugs Approved for Specific Types of Cancer', the original 'wide' CSV table, comprising the fields 'Clinical Condition', 'Approved_Targeted_Therapy', 'drugName', 'brandName' and '_id_', wherein the latter field holds a time stamp.

The Chained Self-Join query below references recordNo and parentRecordNo to group records in the generic tabular representation, as shown in Table 11 below:

TABLE 11

```
SELECT
    a.propVal AS ClinicalCond,
    b.propVal AS ApprovedTargetedTherapy,
    c.propVal AS DrugName,
    d.propVal AS BrandName,
    e.propVal AS _—id_—
FROM NCI_targeted_therapy_drugs_normalized a
JOIN NCI_targeted_therapy_drugs_normalized b
    ON          a.recordNo = a.parentRecordNo+1
                AND b.recordNo = b.parentRecordNo+2
    AND a.parentRecordNo = b.parentRecordNo
JOIN NCI_targeted_therapy_drugs_normalized c
    ON          c.recordNo = c.parentRecordNo+3
    AND a.parentRecordNo = c.parentRecordNo
JOIN NCI_targeted_therapy_drugs_normalized d
    ON          d.recordNo = d.parentRecordNo+4
    AND a.parentRecordNo = d.parentRecordNo
JOIN NCI_targeted_therapy_drugs_normalized e
    ON          e.recordNo = e.parentRecordNo+5
    AND a.parentRecordNo = e.parentRecordNo
```

2.3 Common Table Expressions for RelationshipPrimitives

The generic representation, named 'NCI_targeted_therapy_drugs', referenced in this example, was produced by traversing the HTML source of the National Cancer Institute web page entitled 'List of Targeted Therapy Drugs Approved for Specific Types of Cancer'. Execution of the first two CTE's below selects a contextNode, specified by a combination of propKey and propAttr, as shown in Table 12 below:

TABLE 12

```
WITH containsAttr AS (SELECT * FROM NCI_targeted_therapy_drugs
    WHERE propKey = 'div.class' AND propAttr='accordion'),
--SELECT * FROM containsAttr
contextNode AS (SELECT * FROM NCI_targeted_therapy_drugs
    WHERE recordNo = (SELECT parentRecordNo FROM containsAttr)),
--SELECT * FROM contextNode
--SELECT parentRecordNo FROM contextNode
```

In this example, 'SELECT * FROM contextNode' returns the record shown in Table 13 below:

| recordNo | parentRecordNo | containerNode | level | uniquePropPath | propPath | propKey | propVal | propAttr |
|---|---|---|---|---|---|---|---|---|
| 4863 | 4862 | 1 | 12 | 0-0.1-3.2-188.3-196.4-221.5-3919.6-3924.7-3983.8-4763.9-4775.10-4777.11-4853.12-4862 | html.body.div.div.div.div.div.div.article.div.div.div | div.class | (null) | accordion |

Examples of SQL-Expressions for extracting contextNode attributes include those shown in Table 14 below:

TABLE 14

```
SELECT propAttr AS AttrValue FROM containsAttr
SELECT SUBSTR(propKey,INSTR(propKey,".")+1,LENGTH(propKey)) AS AttrType FROM
containsAttr
SELECT SUBSTR(propKey,INSTR(propKey,".")+1, LENGTH(propKey)) AS AttrType,
    propAttr AS AttrValue
    FROM containsAttr
```

The XPath expression corresponding to the first of these queries, invoking the CTE's to select this contextNode, is "//div[contains(@class,'accordion')]".

In a preferred embodiment, RelationshipPrimitives are provided in the form of the following CTE's, each of these to be used in conjunction with the f-Expression above, comprising two CTE's for specifying a contextNode (which may be the 'root'); in the following code, lines preceded by '-' are comments, wherein numbers or numeric expressions indicate the number of records returned by this query when executed against the generic tabular representation produced from the aforementioned HTML page source, as shown in Table 15 below:

TABLE 15

```
self AS (SELECT * FROM NCI_targeted_therapy_drugs
     WHERE uniquePropPath = (SELECT uniquePropPath FROM containsAttr)
     AND propAttr IS NULL),
--SELECT * FROM self
ancestorOrSelf AS (SELECT * FROM NCI_targeted_therapy_drugs
     WHERE INSTR((SELECT uniquePropPath FROM contextNode),uniquePropPath)
> 0 -- ancestor
     AND containerNode = 0 -- exclude leaves
     AND recordNo > 0 -- exclude root
     AND propAttr IS NULL),
--SELECT * FROM ancestorOrSelf -- 11+1
--SELECT * FROM ancestorOrSelf WHERE propKey IN ('div') -- 8+1
ancestor AS (SELECT * FROM NCI_targeted_therapy_drugs
     WHERE INSTR((SELECT uniquePropPath FROM contextNode),uniquePropPath)
> 0 -- ancestor
     AND level < (SELECT level FROM contextNode) -- exclude 'self'
     AND containerNode = 0 -- exclude leaves
     AND recordNo > 0 -- exclude root
     AND propAttr IS NULL),
--SELECT * FROM ancestor -- 11 = #XPath
--SELECT * FROM ancestor WHERE propKey IN ('div') -- 8
parent AS (SELECT * FROM NCI_targeted_therapy_drugs
    WHERE INSTR((SELECT uniquePropPath FROM contextNode), uniquePropPath) > 0 -
- ancestor
     AND level = (SELECT level FROM contextNode)-1 -- parent
     AND propAttr IS NULL),
--SELECT * FROM parent WHERE propKey NOT IN ('#text') -- 1 = #XPath
preceding AS (SELECT * FROM NCI_targeted_therapy_drugs
    WHERE INSTR((SELECT uniquePropPath FROM contextNode), uniquePropPath) = 0 -
- not an ancestor
     AND recordNo < (SELECT recordNo FROM contextNode) -- preceding in
document order
     AND recordNo > 0
     AND propAttr isNULL),
--SELECT COUNT(*) FROM preceding WHERE propKey NOT IN ('#text','#comment','a') --
964
--SELECT COUNT(*) FROM preceding WHERE propKey IN ('div') -- 294
--SELECT COUNT(*) FROM preceding WHERE propKey IN ('ul') -- 115
--SELECT COUNT(*) FROM preceding WHERE propKey IN ('div','ul','li','p') -- 830
--SELECT COUNT(*) FROM preceding WHERE propKey LIKE 'h %' -- 3
descendantOrSelf AS (SELECT * FROM NCI_targeted_therapy_drugs
    WHERE INSTR(uniquePropPath,(SELECT uniquePropPath FROM contextNode)) > 0 -
- descendant
     AND propAttr IS NULL),
--SELECT COUNT(*) FROM descendantOrSelf WHERE propKey NOT IN('#text') -- 820
--SELECT COUNT(*) FROM descendantOrSelf WHERE propKey = 'div' -- 1
--SELECT COUNT(*) FROM descendantOrSelf WHERE propKey = 'section' -- 31
--SELECT COUNT(*) FROM descendantOrSelf WHERE propKey = 'ul' -- 32
--SELECT COUNT(*) FROM descendantOrSelf WHERE propKey = 'li' -- 310
descendant AS (SELECT * FROM NCI_targeted_therapy_drugs
    WHERE INSTR(uniquePropPath,(SELECT uniquePropPath FROM contextNode)) > 0 -
- descendant
     AND level > (SELECT level FROM contextNode) -- exclude self
     AND propAttr IS NULL),
```

TABLE 15-continued

```
--SELECT COUNT(*) FROM descendant WHERE propKey NOT IN('#text') -- 819
child AS (SELECT * FROM NCI_targeted_therapy_drugs
    WHERE INSTR(uniquePropPath,(SELECT uniquePropPath FROM contextNode)) > 0 -
- descendant
        AND level = (SELECT level FROM contextNode)+1 -- child
        AND propAttr IS NULL),
--SELECT * FROM child WHERE propKey NOT IN ('#text') -- 32
--SELECT * FROM child WHERE propKey = 'section' -- 31
following AS (SELECT * FROM NCI_targeted_therapy_drugs
    WHERE INSTR(uniquePropPath,(SELECT uniquePropPath FROM contextNode)) = 0 -
- not a descendant
        AND recordNo > (SELECT recordNo FROM contextNode) -- 'following' in doc
order
        AND propAttr isNULL),
--SELECT * FROM following WHERE propKey NOT IN ('#text') -- 125
--SELECT * FROM following WHERE propKey IN ('div') -- 15
--SELECT * FROM following WHERE propKey IN ('div','ul', 'li','p') -- 51
--SELECT * FROM following WHERE propKey LIKE 'h_' -- 6
preceding-sibling AS (SELECT * FROM NCI_targeted_therapy_drugs
    WHERE parentRecordNo = (SELECT parentRecordNo FROM contextNode)
        AND recordNo < (SELECT recordNo FROM contextNode)
        AND propAttr IS NULL),
--SELECT * FROM preceding-sibling WHERE propKey != '#text' -- 1
following-sibling AS (SELECT * FROM NCI_targeted_therapy_drugs
    WHERE parentRecordNo = (SELECT parentRecordNo FROM contextNode)
        AND recordNo > (SELECT recordNo FROM contextNode)
        AND propAttr IS NULL)
--SELECT * FROM following-sibling WHERE propKey != '#text' -- 0
```

2.4 Relationship Primitives for Mining HTML Page Sources
2.4.1 Content Extraction from NCI Listing of Approved Targeted Therapies As with XPath expressions, different r-Expressions may be devised to select the same node set. This is illustrated here, for the generic tabular representation generated from the HTML source of the National Cancer Institute web page entitled 'List of Targeted Therapy Drugs Approved for Specific Types of Cancer', with further aspects described in Example 2.3 First, specify a context node, here by limiting the node set of interest to targeted therapies approved for lung cancer; here lines starting with '-' are comments that may include usage examples (i.e.—SELECT . . . ), as shown in Table 16 below:

TABLE 16

```
WITH containsAttr AS (SELECT * FROM NCI_targeted_therapy_drugs
    WHERE propKey = 'h2.id' AND propAttr LIKE '%approved-for-lung-cancer'),
--SELECT * FROM containsAttr
contextNode AS (SELECT * FROM NCI_targeted_therapy_drugs
    WHERE recordNo = (SELECT parentRecordNo FROM containsAttr)),
--SELECT * FROM contextNode
--SELECTparentRecordNo FROM contextNode
```

Next, navigate relative to that context node, by one of the following SQL-Expressions.

Alternative 1: chaining two RelationshipPrimitives, as shown in Table 17 below:

TABLE 17

```
--first navigate UP, to PARENT of context node of type 'section'
parent AS (SELECT * FROM NCI_targeted_therapy_drugs
    WHERE INSTR((SELECT uniquePropPath FROM contextNode),uniquePropPath) > 0 -
- ancestor
        AND level = (SELECT level FROM contextNode)-1 -- parent
        AND propAttr IS NULL),
parentSection AS (SELECT * FROM parent WHERE propKey ='section'),
-- then navigate DOWN, to DESCENDANT of PARENT of type 'section'
descendant AS (SELECT * FROM NCI_targeted_therapy_drugs
    WHERE INSTR(uniquePropPath,(SELECT uniquePropPath FROM parentSection)) > 0
        AND level > (SELECT level FROM parentSection) -- exclude self
        AND propAttr IS NULL)
SELECT SUBSTR(propVal,1,INSTR(propVal,'(')-1) AS GenericName,
    SUBSTR(propVal,INSTR(propVal,'(')+1,LENGTH(propVal)-INSTR(propVal,'(')-1) AS
TradeName
```

TABLE 17-continued

```
FROM descendant
  WHERE propPath LIKE '%section.ul.li%#text' -- to accommodate occasional extra
'span' elem
  AND LENGTH(propVal) > 2 -- ad hoc: to remove spurious entries in the page source
SELECT parentRecordNo FROM contextNode
```

Here, the first p-Expression, for parent, references the context node, while the second p-Expression, for descendant, references parentSection, extracted from parent.

Alternative 2: using a single RelationshipPrimitive, as shown in Table 18 below:

TABLE 18

```
-- determine the nodes FOLLOWING the context node
following AS (SELECT * FROM NCI_targeted_therapy_drugs
  WHERE INSTR(uniquePropPath,(SELECT uniquePropPath FROM contextNode)) = 0
    AND recordNo > (SELECT recordNo FROM contextNode) -- 'following' in doc
order
    AND propAttr isNULL)
SELECT SUBSTR(propVal,1,INSTR(propVal,'(')–1) AS GenericName,
  SUBSTR(propVal,INSTR(propVal,'(')+1,LENGTH(propVal)-INSTR(propVal,'(')–1) AS
BrandName
  FROM following WHERE propPath LIKE '%section.ul.li%.a.#text'
```

Either expression produces output in the form of the 2-column table shown in FIG. 11, holding approved targeted therapies for the selected condition, here 'lung cancer':

2.4.2 Link Extraction from the HTML Page Source for a Specific Targeted Therapy

Consider the following XPath expressions for extracting links from a page giving details of a targeted therapy of interest, here 'osimertinib', which is approved for the treatment of certain lung cancers; the XPath implementation below references the R-functions 'read_html', 'xml_find_all' and 'xml_text', in the R package 'xml2', available at the CRAN repository; lines starting with '>' show R expressions, lines starting with '[1]' show output, as shown in Table 19 below:

TABLE 19

```
htmlImport <- read_html("https://www.cancer.gov//about-
cancer/treatment/drugs/osimertinib")
>xml_text(xml_find_all(htmlImport,"//div[contains(@class,'accordion')]/descendant::
a[contains(@href,'dailymed')]/@href"))
[1] "https://dailymed.nlm.nih.gov/dailymed/drugInfo.cfm?setid=5e81b4a7-b971-45e1-
9c31-29cea8c87ce7&audience=consumer"
>xml_text(xml_find_all(htmlImport,"//div[contains(@class,'accordion')]/descendant::
a[contains(@href,'clinical-trials')]/@href"))
[1] "https://www.cancer.gov/about-cancer/treatment/clinical-
trials/intervention/C116377"
```

RelationshipPrimitives corresponding to these XPath expressions may be implemented in the form of parametrized CTE's, shown below, where lines commencing with '-' are comment lines, as shown in Table 20 below:

TABLE 20

```
--select context node by specifying attribute
WITH containsAttr AS (SELECT * FROM _@table_name@_
    WHERE propKey = _@propKey@_ AND propAttr = _@propAttr@_ ),
--SELECT * FROM containsAttr
contextNode AS (SELECT * FROM _@table_name@_
    WHERE recordNo = (SELECT parentRecordNo FROM containsAttr)),
--SELECT * FROM contextNode
--SELECT uniquePropPath FROM contextNode
--specify relationship primitive 'descendant' with reference to 'contextNode'
descendant AS (SELECT * FROM _@table_name@_
    WHERE INSTR(uniquePropPath,(SELECT uniquePropPath FROM contextNode)) > 0 -
- descendant
        AND level > (SELECT level FROM contextNode) -- exclude self
        AND propAttr IS NULL)
--SELECT * FROM descendant
--SELECT * FROM descendant WHERE propKey IN('a')
--SELECT recordNo FROM descendant WHERE propKey IN('a')
-- select related 'attribute' records
SELECT propAttr FROM _@table_name@_
    WHERE parentRecordNo IN (SELECT recordNo FROM descendant WHERE propKey
IN ('a'))
    AND propKey IN ('a.href')
    AND propAttr LIKE _@attrValue@_
```

To invoke this parametrized SQL-Expression, perform the following substitutions, in the chosen host language, as shown in Table 21 below:

TABLE 21

```
-  for _@table_name@_ : the name of a table holding the generic representation of
   the HTML source of a specific approved targeted therapy of interest, e.g. the
   National Cancer Institute web page for 'osimertinib', at 'cancer.gov//about
   cancer/treatment' under the headings 'drugs/osimertinib'
-  for _@propKey@_ and _@propAttr@_: 'div.class' and 'accordion', respectively:
-  for _@attrValue@_ : the string '%dailymed%' to obtain a link to a 'dailymed' page
   giving prescribing information:
   "https://dailymed.nlm.nih.gov/dailymed/drugInfo.cfm?setid=5e81b4a7-b971-45e1-
   9c31-29cea8c87ce7&audience=professional" ; OR the string '%clinical-trials%' to
   obtain a link to a page displaying information on current clinical trials testing the
   drug of interest: "https://www.cancer.gov/about-cancer/treatment/clinical-
   trials/intervention/C116377"
```

More generally, as with _@propAttr@_in the CTE 'containsAttr', above, parameters may be used in lieue of other specific arguments used here for propKey and propAttr.

2.5 Implementing RelationshipPrimitives as User-Defined SQLite Functions

A compact alternative to the chained CTE's in Alternative 1 of Example 2.4.1 may be devised by defining SQL functions for specifying the context node and for implementing the RelationshipPrimitives Parent and Descendant, where Parent is a special case of Ancestor with a level_offset of −1 relative to that of the context node, as in Example 2.3.

Accordingly, define the following functions:

public static void GetContextNode(tb, propKey, propAttr), which returns an array holding the record for the specified context node;

public static void Ancestor(tb, contextNode, propAttr=NULL, level_offset=NULL), which returns an array holding records for the Ancestor node set of 'context node';

public static void Parent=public static void Ancestor(tb, contextNode, propAttr=NULL, level_offset=−1), which returns an array holding the record for the Parent of 'context node';

public static void Descendant(tb, contextNode, propAttr=NULL, level_offset=NULL), which returns an array holding records for the Descendant node set of 'contextNode'.

Next, devise a query invoking these functions to produce the table in FIG. 11, previously produced by the chained CTE's in Example 2.4.1, and as shown in Table 22 below:

TABLE 22

```
SELECT
    SUBSTR(propVal,1,INSTR(propVal,'(')-1) AS GenericName,
    SUBSTR(propVal,INSTR(propVal,'(')+1,LENGTH(propVal)-INSTR(propVal,'(')-1)AS
        TradeName
    FROM Descendant(tb, contextNode=
        Ancestor(tb, contextNode=
            getContextNode(tb, propKey='h2.id', propAttr='%for- lung-cancer%'),
        level_offset = −1))
```

TABLE 22-continued

```
WHERE propPath LIKE '%section.ul.li%#text' -- to accommodate occasional extra 'span'
elem
AND LENGTH(propVal) > 2 -- ad hoc: to remove spurious entries in the page source
```

Evidently, this query, with its nested function calls to replicate the chaining of CTE's, is more compact than that in Example 2.4.1.

2.6 R Code Fragments for Forming, Instantiating and Executing Parametrized r-Expressions The creation, instantiation and execution of r-Expressions comprising parametrized CTE's to emulate an XPath expression invoking the XPath function 'contains' to specify a context node, and then invoking the XPath axis Descendant to select the desired node set with attribute 'ul' is here illustrated by 'R' code fragments (R Core Team (2020). R:

A language and environment for statistical computing. R Foundation for Statistical Computing, Vienna, Austria).

The code invokes only the R base functions paste and sprintf, to construct parametrized queries, and gsub (in conjunction with a basic regular expression) to instantiate them; corresponding functions for all other RelationshipPrimitives disclosed herein are readily implemented in like fashion, with reference to the corresponding SQL-Expressions given in 'Detailed Description' and 'Examples'; here, lines starting with '#' are comments.

First, define functions, as shown in Table 23 below:

TABLE 23

```
# check whether 'args' contains the elements in '...'
isArg <- function(args, ...) {
    all(sapply(list(...), function(e) any(names(args) %in% e)))
}
# create a parametrized SQL-Expression corresponding to the XPath function 'contains'
# accepts:           tb = string identifying table name
#                    ... = list of strings
contains <- function(tb,...) {
  a <- list(...)
  if(!isArg(a, "nodeType")) return(NULL)
  propKey <- if(isArg(a, "nodeAttr"))
    paste(a[["nodeType"]], a["nodeAttr"]], sep=".") else a[["nodeType"]]
  propAttr <- if(isArg(a, "nodeAttrVal")) a[["nodeAttrVal"]] else NULL
  q <- sprintf("SELECT * FROM '%s' WHERE propKey='%s'",tb,propKey)
  q <- if(is.null(propAttr)) q else paste(q,sprintf("AND propAttr='%s'",propAttr),sep=' ')
}
# usage example
#> (cn <- contains("_@tableNm@_",nodeType="_@nodeType@_",
#                  nodeAttr='_@nodeAttr@_',nodeAttrVal='_@nodeAttrVal@_'))
Output
"SELECT * FROM '_@tableNm@_' WHERE propKey='_@nodeType@_._@nodeAttr@_'
AND #propAttr='_@nodeAttrVal@_'"
# instantiate SQL-Expression for selecting a context node
# accepts:           tb = string identifying table name
#                    ... = list of strings
# returns:           instantiated SQL-Expression
contextNode <- function(tb,...) {
  a <- list(...)
  q <- sprintf(gsub("(_@[a-zA-Z]+@_)+", "%s",
        contains(tb="_@tableNm@_", nodeType="_@nodeType@_",
          nodeAttr='_@nodeAttr@_',
            nodeAttrVal='_@nodeAttrVal@_')),
          tb=tb, nodeType=a[["nodeType"]], nodeAttr=a[["nodeAttr"]],
            nodeAttrVal=a[["nodeAttrVal"]])
}
# usage example
#> (cnNodeQ <- contextNode(tb="Vars_NCI_targeted_therapy_drugs",
#                  nodeType='div',nodeAttr='class',nodeAttrVal='accordion'))
Output
"SELECT * FROM 'Vars_NCI_targeted_therapy_drugs' WHERE propKey='div.class' AND
propAttr='accordion'"
# implement RelationshipPrimitive Descendant
# accepts:           axis = str identifying XPath axis
#                    tb = str identifying db table
#                    propKey = str specifying 'propKey'; def here replaced by 'NOT IN ('#text')'
#                    propAttr = str specifying 'propAttr'
#                    ... = list of additional args
# returns:           instantiated SQL-Expression
rP.descendant <- function(axis, tb, propKey=NULL, propAttr=NULL, ...) {
  a <- list(...)
  q <- sprintf("SELECT * FROM %s",tb)
  if(identical(axis, "descendant")) {
    if( !isArg(a, "uPP", "uPPField") ) return(NULL)
    if( !isArg(a, "level", "levelField") ) return(NULL)
    q <- paste(q, sprintf("WHERE INSTR(%s, '%s') > 0", a["uPPField"]], a["uPP"]]), sep='
')
    paste(q, sprintf("AND %s > '%s'", a["levelField"]], a["level"]]), sep=' ') # exclude
```

TABLE 23-continued

```
self
  } else {
    message("...unknown XPath axis",axis)
    return(NULL)
  }
  q <- paste(q, if(is.null(propKey))
      sprintf("AND propKey NOT IN ('#text')") else sprintf("AND
      propKey='%s'",propKey),sep=' ')
  q <- paste(q, if(is.null(propAttr))
    sprintf("AND propAttr IS NULL") else sprintf("AND propAttr='%s'",propAttr),sep=' ')
}
# usage example
# rExpr <- rP.descendant("descendant",tb,propKey='ul',propAttr=NULL,
#                    uPPField="uniquePropPath",uPP=cnNode[,"uniquePropPath"],
#                    levelField="level",level=cnNode[,"level"])
Output:
"SELECT * FROM NCI_targeted_therapy_drugs WHERE INSTR(uniquePropPath,'.0-0.1-
3.2-188.3-196.4-221.5-3919.6-3924.7-3983.8-4763.9-4775.10-4777.11-4853.12-4862') >
0 AND propKey='ul' AND propAttr IS NULL"
```

Next, invoke these functions to create and instantiate, then execute SQLExpressions (making reference to the function dbGetQuery, provided in R package 'DBI', available at 'cran.org'), where, as above, NCI_targeted therapy drugs is the name of the generic tabular representation for the HTML source of the National Cancer Institute web page entitled 'List of Targeted Therapy Drugs Approved for Specific Types of Cancer', as shown in Table 24 below:

TABLE 24

```
# select context node
cnNodeQ <- contextNode(tb="NCI_targeted_therapy_drugs",
  nodeType='div', nodeAttr='class',nodeAttrVal='accordion')
cnNode <- dbGetQuery(con, cnNodeQ)
# invoke RelationshipPrimitive 'descendant', with propKey 'ul', to select nodeset
  rExp <- rP.descendant("descendant",tb, propKey='ul', propAttr=NULL,
    uPPField="uniquePropPath", uPP=cnNode[,"uniquePropPath"],
    levelField="level", level=cnNode[,"level"])
nodeSet <- dbGetQuery(con, xPathQ)
```

The output stored in 'cnNode' and 'nodeSet' is shown in FIG. 12.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", containing", etc. are to be read expansively and without limitation. The methods illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method performed by way of a program executed on at least one processor, comprising:
   storing content from data sources each having an arbitrarily deeply nested source data structure, and representing the data sources in a tabular representation that encodes the arbitrarily deeply nested source data structure, wherein the data sources which must be accepted for the storing and representing are: tables, API payloads, web pages, databases, documents, and files, in any of the file formats XML, xHTML, HTML, SVG, JSON, FHIR, YAML, RDF/JSON-LD, CSV and TXT, and wherein the tabular representation has at least a first PathCode, a Key and a Value column, and has a total number of columns independent of said source data structure, and wherein the storing and the representing includes:

mapping the arbitrarily deeply nested source data structure to the tabular representation by:

recursively traversing an in-memory representation of the said arbitrarily deeply nested source data structure and concurrently constructing at least a first type of PathCode, wherein each at least first PathCode comprises a unique encoding of an absolute path to a designated node among a collection of nodes in said arbitrarily deeply nested source data structure, thereby encoding the arbitrarily deeply nested source data structure;

extracting information associated with said designated node; and recording said at least first PathCode and the information in said at least first PathCode, Key and Value columns of the tabular representation; and navigating and transforming the tabular representation by non-recursive SQL expressions, thereby providing a generic tabular representation for arbitrarily deeply nested data sources of disparate type or format, capable of being queried by non-recursive SQL-Expressions.

2. The method of claim 1 wherein the tabular representation is created by traversal of said arbitrarily deeply nested data structure without referencing a schema description.

3. The method of claim 1 wherein said first PathCode, for a designated node in the arbitrarily deeply nested structure, is a string having multiple concatenated elements, each element representing a node of the absolute path from the root to said designated node, the element referencing at least: a level, which is an integer representing the number of edges along the absolute path from the root to the node represented by the element; and a numeric index of a record in the tabular representation for the node represented by the element.

4. The method of claim 3 wherein, for a flat table or unstructured source document, a root of the tabular representation comprises a virtual root with a record number for a parental record set to −1 and each node is a child of the root.

5. The method of claim 1 wherein for a tagged source document format, the tabular representation further includes a field for recording the value of text enclosed by tags in the tagged source document format.

6. The method of claim 1 wherein the tabular representation further includes a field for recording a time stamp, and is operated as an event store.

7. The method of claim 1 wherein the tabular representation further includes a field for recording a unique source document identifier.

8. The method of claim 7 wherein a single instance of the tabular representation holds content from two or more data structures of the same or different type or format, each with a unique source document identifier.

9. The method of claim 1 further including querying the tabular representation by one or more t-Expressions, which are SQL-Expressions for transforming the tabular representation.

10. The method of claim 9 further including transforming the tabular representation using t-Expressions that include Chained Self-Joinswhich represent a pattern of SQL-Expressions, into a table having columns named by items selected from the tabular representation.

11. The method of claim 9 wherein t-Expressions include r-Expressions, which are SQL-Expressions implementing the functional equivalent of XPath expressions, for navigating and transforming the tabular representation.

12. The method of claim 11 wherein r-Expressions include RelationshipPrimitives implementing the functional equivalent of the XPath axes SELF, ANCESTOR-OR-SELF, ANCESTOR, PARENT, PRECEDING, PRECEDING-SIBLING, FOLLOWING, FOLLOWING-SIBLING, CHILD, DESCENDANT, DESCENDANT-OR-SELF.

13. The method of claim 11 wherein r-Expressions including RelationshipPrimitives are implemented as SQL common table expressions without recursion.

14. The method of claim 11 wherein r-Expressions including RelationshipPrimitives are implemented as user-defined SQL functions.

15. The method of claim 11 wherein r-Expressions including RelationshipPrimitives are formed, instantiated and executed in a host language.

16. The method of claim 1 wherein the tabular representation is an intermediate representation, of content from said data sources of disparate type and format, and at least some selected and transformed content of the data sources capable of being rendered for display to users or being transmitted to electronic data systems.

17. The method of claim 1 wherein the mapping step is performed losslessly.

18. The method of claim 1 wherein mapping step includes filtering.

19. The method of claim 1 further including a second PathCode wherein the source document format is a tagged format and each designated node is identified by a tag and a matched closing tag, and the second PathCode has one or more of said tags which may be concatenated.

20. The method of claim 19 wherein optional attributes of a designated node are stored under the first PathCode of said node and recorded in a row following the row of said node.

21. The method of claim 1 further including a second PathCode wherein the source document format is a key: value format and each designated node is identified by a key, and the second PathCode has one or more of said keys, which may be concatenated.

22. A method using a program executed on at least one processor, comprising:

storing content from data sources each having an arbitrarily deeply nested source data structure, and representing the data sources in a tabular representation that encodes the arbitrarily deeply nested source data structure, wherein the data sources which must be accepted for the storing and representing are: tables, API payloads, web pages, databases, documents, and files, in any of the file formats XML, xHTML, HTML, SVG, JSON, FHIR, YAML, RDF/JSON-LD, CSV and TXT, and wherein the storing and the representing includes:

mapping the arbitrarily deeply nested source data structure to a tabular representation having at least a first PathCode, a Key and a Value field column, and having a total number of columns independent of the source data structure, by:

recursively traversing an in-memory representation of the said data structure, and concurrently therewith constructing at least the first PathCode comprising a unique encoding of absolute paths to nodes in said arbitrarily deeply nested source data structure, thereby preserving the hierarchical organization of the deeply nested source data structure; and recording the first PathCode in the first PathCode column, and recording information associated with said nodes in the Key and Value columns of the tabular representation;

querying said tabular representation by invoking t-Expressions for navigating and transforming the tabular representation or content selected therefrom; and thereby obtaining query results from an arbitrarily deeply nested source structure without invoking recursive SQL expressions.

23. A method using a program executed on at least one processor, comprising:

storing content from data sources each having an arbitrarily deeply nested source data structure in a tabular representation that encodes the arbitrarily deeply nested source data structure, wherein the data sources which must be accepted for the storing are: tables, API payloads, web pages, databases, documents, and files, in any of the file formats XML, xHTML, HTML, SVG, JSON, FHIR, YAML, RDF/JSON-LD, CSV and TXT, and wherein the storing comprises mapping the arbitrarily deeply nested source data structure to a tabular representation having at least a first PathCode, a Key and a Value field column, and having a total number of columns independent of the source data structure, by:

recursively traversing an in-memory representation of the said data structure, and concurrently therewith constructing at least the first PathCode comprising a unique encoding of absolute paths to nodes in said arbitrarily deeply nested source data structure, thereby preserving the hierarchical organization of the deeply nested source data structure; and recording the first PathCode in the first PathCode column, and information associated with said nodes in the Key and Value columns of the tabular representation;

navigating and transforming the tabular representation or content selected therefrom by invoking t-Expressions to query said tabular representation; and thereby obtaining query results from an arbitrarily deeply nested source structure without invoking recursive SQL expressions.

* * * * *